United States Patent
Noda et al.

(10) Patent No.: US 9,073,045 B2
(45) Date of Patent: Jul. 7, 2015

(54) CARBON NANO-TUBE MANFUACTURING METHOD AND CARBON NANO-TUBE MANUFACTURING APPARATUS

(75) Inventors: Suguru Noda, Tokyo (JP); Hisashi Sugime, Tokyo (JP); Yukio Yamaguchi, Kawasaki (JP); Toshio Osawa, Tokyo (JP); Kazunori Kakehi, Okazaki (JP); Kei Hasegawa, Tokyo (JP); Dong Young Kim, Tokyo (JP)

(73) Assignee: Hitachi Chemical Company, Ltd., Tokyo (JP)

(*) Notice: Subject to any disclaimer, the term of this patent is extended or adjusted under 35 U.S.C. 154(b) by 0 days.

(21) Appl. No.: 12/921,382

(22) PCT Filed: Mar. 6, 2009

(86) PCT No.: PCT/JP2009/054284
§ 371 (c)(1),
(2), (4) Date: Dec. 9, 2010

(87) PCT Pub. No.: WO2009/110591
PCT Pub. Date: Sep. 11, 2009

(65) Prior Publication Data
US 2011/0085961 A1    Apr. 14, 2011

(30) Foreign Application Priority Data
Mar. 7, 2008 (JP) ................. P2008-058825

(51) Int. Cl.
*D01F 9/12* (2006.01)
*B01J 19/00* (2006.01)
(Continued)

(52) U.S. Cl.
CPC .............. *B01J 23/745* (2013.01); *B01J 8/0055* (2013.01); *B01J 8/1836* (2013.01); *B01J 8/34* (2013.01);
(Continued)

(58) Field of Classification Search
USPC ........ 423/447.1–447.3, 445 B; 977/742–754, 977/842–848
See application file for complete search history.

(56) References Cited

U.S. PATENT DOCUMENTS 6,333,016 B1  12/2001  Resasco et al.
6,413,487 B1  7/2002  Resasco et al.
(Continued)

FOREIGN PATENT DOCUMENTS

JP    2003-286015    10/2003
JP    2003-535794    12/2003
(Continued)

OTHER PUBLICATIONS

International Search Report dated Mar. 31, 2009, for International Application No. PCT/JP2009/054284.
(Continued)

*Primary Examiner* — Daniel C McCracken
(74) *Attorney, Agent, or Firm* — Fitch Even Tabin & Flannery

(57) ABSTRACT

The method for producing carbon nanotubes employs a carbon source that contains carbon and is decomposed when heated and a catalyst on a support that serves as a catalyst for production of carbon nanotubes from the carbon source. The method includes a catalyst loading step in which the catalyst starting material is distributed over the support to load the catalyst onto the support, a synthesis step in which the carbon nanotubes are synthesized on the support, and a separating step in which a separating gas stream is distributed over the support to separate the carbon nanotubes from the support, wherein the catalyst loading step, the synthesis step and the separating step are carried out while keeping the support in a heated state and switching supply of the catalyst starting material, the carbon source and the separating gas stream.

6 Claims, 15 Drawing Sheets

(51) Int. Cl.

| | | |
|---|---|---|
| *B82Y 30/00* | (2011.01) | |
| *B82Y 40/00* | (2011.01) | |
| *B01J 23/745* | (2006.01) | |
| *B01J 8/00* | (2006.01) | |
| *B01J 8/18* | (2006.01) | |
| *B01J 8/34* | (2006.01) | |
| *B01J 37/34* | (2006.01) | |
| *C01B 31/02* | (2006.01) | |
| *B01J 23/28* | (2006.01) | |
| *B01J 23/70* | (2006.01) | |
| *B01J 37/02* | (2006.01) | |

(52) U.S. Cl.
CPC . *B01J 23/28* (2013.01); *B01J 23/70* (2013.01); *B01J 37/0209* (2013.01); *B01J 37/0217* (2013.01); *B01J 37/0221* (2013.01); *B01J 37/0238* (2013.01); *B01J 37/0244* (2013.01); *B01J 37/347* (2013.01); *B01J 2208/00407* (2013.01); *B82Y 30/00* (2013.01); *B82Y 40/00* (2013.01); *C01B 31/0226* (2013.01); *C01B 2202/04* (2013.01)

(56) References Cited

U.S. PATENT DOCUMENTS

| | | | |
|---|---|---|---|
| 6,919,064 | B2 | 7/2005 | Resasco et al. |
| 6,955,800 | B2 * | 10/2005 | Resasco et al. ............ 423/447.3 |
| 6,962,892 | B2 | 11/2005 | Resasco et al. |
| 6,994,907 | B2 | 2/2006 | Resasco et al. |
| 7,094,386 | B2 | 8/2006 | Resasco et al. |
| 7,153,903 | B1 | 12/2006 | Barraza et al. |
| 7,279,247 | B2 | 10/2007 | Matarredona et al. |
| 7,902,104 | B2 | 3/2011 | Kalck et al. |
| 2002/0131910 | A1 | 9/2002 | Resasco et al. |
| 2005/0170089 | A1 * | 8/2005 | Lashmore et al. ......... 427/248.1 |
| 2006/0104887 | A1 * | 5/2006 | Fujioka et al. ............. 423/447.3 |

FOREIGN PATENT DOCUMENTS

| | | |
|---|---|---|
| JP | 2004-76197 | 3/2004 |
| JP | 2004-76198 | 3/2004 |
| JP | 2004-238261 | 8/2004 |
| JP | 2004-532180 | 10/2004 |
| JP | 2008-503339 | 2/2008 |
| WO | WO 0194260 | 12/2003 |
| WO | 2006003482 | 1/2006 |

OTHER PUBLICATIONS

S. Iijima, "Helical microtubules of graphitic carbon", *Letters to Nature*, vol. 354, Nov. 7, 1991, pp. 56-58.

H. Dai, et al., "single-wall nanotubes produced by metal-catalyzed disproportionation of carbon monoxide", *Chemical Physics Letters*, vol. 260 (1996), pp. 471-475.

M. J. Bronikowski, et al., "Gas-phase production of carbon single-walled nanotubes from carbon monoxide via the HiPco process: A parametric study", *J. Vac. Sci. Technol. A.*, vol. 19, No. 4, Jul./Aug. 2001, pp. 1800-181805.

K. Hata, et al., "Water-Assisted Highly Efficient Synthesis of Impurity-Free Single-Walled Carbon Nanotubes", *Science*, vol. 306, Nov. 19, 2004, pp. 1362-1364.

Transmittal of the Translation of the International Preliminary Report on Patentability dated Oct. 21, 2010, for International Application No. PCT/JP2009/054284.

Japanese Official Action dated Dec. 3, 2013, for JP Application No. 2010-501975.

Japanese Official Action dated Sep. 3, 2013, for JP Application No. 2010-501975.

* cited by examiner (a)

(b)

(a)

(b)

(c)

(a)

(b)

(c)

(a)

(b)

(a)
After oxidative removal of CNT, upon completion of 1st cycle (b)
After SiO2 coat and Fe/Al2O3 loading (simultaneous)

(c)
After completion of 2nd cycle (a)

(b)

first cycle (c)

second cycle (d)

third cycle (e)

fourth cycle (f)

CARBON NANO-TUBE MANFUACTURING METHOD AND CARBON NANO-TUBE MANUFACTURING APPARATUS

TECHNICAL FIELD

The present invention relates to a method for producing carbon nanotubes and to an apparatus for producing carbon nanotubes. More specifically, the invention relates to a method for producing carbon nanotubes of different structures by high-volume production on a large scale and at low cost, and to an apparatus for producing carbon nanotubes used in the production method.

BACKGROUND ART

Carbon nanotubes are a type of material having a structure wherein a graphene sheet is rolled in a tubular manner, and their linear structure has an exceedingly high aspect ratio (see Non-patent document 1). Carbon nanotubes are known to have superb mechanical properties such as strength and flexibility, semiconductor or metal conductivity, and highly stable chemical properties. Arc discharge methods, laser evaporation methods, chemical vapor deposition methods (hereunder referred to as CVD) and the like have been reported as methods for producing carbon nanotubes. CVD, in particular, is a synthesis method noted as being suitable for large-scale synthesis, continuous synthesis and high purification (see Saito, R., Shinohara, H., joint editors, "Carbon Nanotubes: Fundamentals and Applications", Baifukan Co., Ltd., 2004).

Single-wall carbon nanotubes (hereunder abbreviated as "SWCNT") have been confirmed to exhibit metal properties and semiconductor properties depending on their rolled forms and their diameters, and they are expected to have applications in electrical and electronic elements. Catalytic CVD (see Non-patent document 2, for example), is the main method for growing nanotubes in synthesis of SWCNT. Catalytic CVD uses metal nanoparticles as catalyst. A gaseous carbon source is supplied while thermally decomposing the carbon source at high temperature and growing nanotubes from the catalyst metal nanoparticles. The catalyst nanoparticles are used in a gas-phase dispersed state for the production (method A). Another method employs the catalyst nanoparticles in a state supported on a substrate (method B). Both method A and method B have advantages and disadvantages.

[Existing SWCNT Production Methods]

FIG. 12 shows an overview of method A using a gas-phase dispersed catalyst. Nanotubes are synthesized by simultaneously blowing the catalyst source and carbon source into an external heated reactor. A typical synthesis method classified as method A is the HiPco method (see Non-patent document 3, for example). This method A effectively utilizes the three-dimensional space of the reactor. However, because the catalyst is entrained with the reactive gas, the residence time of the catalyst in the reactor is short and the catalyst becomes incorporated into the product nanotubes. In addition, because the catalyst nanoparticles have a small size of several nm and undergo rapid aggregation, it is difficult to increase the spatial concentration of the catalyst and the nanotube synthesis rate is about 1 g/day per 1 L reactor volume.

FIG. 13 shows an overview of method B using a substrate-supported catalyst. This method B supports the catalyst on a substrate and supplies the carbon source onto the catalyst to grow nanotubes on the catalyst. The Super Growth method (see Non-patent document 4, for example) is classified as such a method B, and it is a typical synthesis method. This method B allows high-speed growth. High-speed growth of 2.5 mm/10 min, for example, is possible (Non-patent document 4). Moreover, the catalyst is anchored on the substrate, thus minimizing incorporation of the catalyst into the synthesized nanotubes. However, because the reactor can only utilize flat two-dimensional space, utilization of the reactor interior space is inferior to method A.

In addition, a separating step is necessary to separate the synthesized nanotubes. For mass production of nanotubes, it is indispensable for the catalyst-supported substrate to be reusable, but such technology has not yet been established. Several patent documents exist describing the use of particles instead of a substrate for anchoring of the catalyst in method B, with synthesis of the carbon nanotubes using a fluidized bed. For example, Patent document 1 discloses a production apparatus for a tube-like carbon material. There is disclosed therein a fluidized bed reactor that accomplishes continuous production of carbon nanotubes (see paragraph [0007] of Patent document 1).

Another technique for production of carbon nanotubes using a fluidized bed is CoMoCAT$^R$. This technique is a method for production of carbon nanotubes by contacting a carbon-containing gas with a catalyst comprising a Group VIII metal such as cobalt (Co) and a Group VIa metal such as molybdenum (Mo), which has been developed by Oklahoma University, U.S. and implemented by Southwest technologies. Patent documents 2-10 are U.S. Patents relating to this technique for production of carbon nanotubes, and are a listing of patents owned by Oklahoma University, U.S.

In these fluidized bed synthesis methods, a catalyst is supported on support particles such as porous silica to synthesize nanotubes, the nanotubes are removed from the fluidized bed apparatus together with the support particles, and the support particles and catalyst are dissolved with an acid or the like to recover the nanotubes. Since the catalyst particle-attached support particles are disposable, while the step of removing the support and catalyst from the nanotubes is complex and the procedure is a batch system with low productivity, the cost of SWCNT is extremely high, at 50,000 yen/g or greater.

[Non-patent document 1] S. Iijima, Nature 354, 56 (1991).

[Non-patent document 2] H. Dai, A. G. Rinzler, P. Nikolaev, A. Thess, D. T. Colbert, and R. E. Smalley, Chem. Phys. Lett. 260, 471 (1996).

[Non-patent document 3] HiPco Method: M. J. Bronikowski, P. A. Willis, D. T. Colbert, K. A. Smith, and R. E. Smalley, J. Vac. Sci. Technol. A 19, 1800 (2001).

[Non-patent document 4] K. Hata, D. N. Futaba, K. Mizuno, T. Namai, M. Yumura, and S. Iijima, Science 306, 1362 (2004).

[Patent document 1] Japanese Unexamined Patent Application Publication No. 2003-286015

[Patent document 2] U.S. Pat. No. 6,333,016, "Method of Producing Nanotubes"

[Patent document 3] U.S. Pat. No. 6,413,487, "Method and Apparatus for Producing Nanotubes"

[Patent document 4] U.S. Pat. No. 6,919,064, "Process and Apparatus for Producing Single-Walled Carbon Nanotubes"

[Patent document 5] U.S. Pat. No. 6,955,800, "Method and Apparatus for Producing Single-Walled Carbon Nanotubes"

[Patent document 6] U.S. Pat. No. 6,962,892, "Metallic Catalytic Particle for Producing Single-Walled Carbon Nanotubes"

[Patent document 7] U.S. Pat. No. 6,994,907, "Carbon Nanotube Product Comprising Single-Walled Carbon Nanotubes"

[Patent document 8] U.S. Pat. No. 7,094,386, "Method of Producing Single-Walled Carbon Nanotubes/Ceramic Composites"

[Patent document 9] U.S. Pat. No. 7,153,903, "Carbon Nanotube-Filled Composites Prepared by In-situ Polymerization"

[Patent document 10] U.S. Pat. No. 7,279,247, "Carbon Nanotube Pastes and Methods of Use"

SUMMARY OF INVENTION

Technical Problem

The market price of SWCNT is higher than that of precious metals. The high cost of SWCNT is a major obstacle to applications that utilize the mechanical characteristics and conductive properties of SWCNT. It is expected that allowing production of carbon nanotubes on a large scale at low cost will permit rapid realization of numerous applications. Innovation of carbon nanotube production techniques and lowering of their production cost are therefore essential. In carbon nanotube synthesis methods employing a support, according to method B, the catalyst is supported at low temperature and the temperature is increased to synthesize the carbon nanotubes, while the temperature is lowered to recover the carbon nanotubes.

Most of the time is consumed by raising and lowering the temperature, and productivity is therefore very low. In catalyst spraying synthesis without a support, according to method A, the catalyst loading, carbon nanotube growth and carbon nanotube recovery are all carried out simultaneously, and therefore the temperature is constant. In method A, both the catalyst and the carbon nanotubes float in a gas phase, and flow out together with the flow of gas discharged from the reactor. It is a disadvantage that, since the catalyst is floating, the number density of the catalyst is not increased and the carbon nanotubes and catalyst are recovered in a mixed state.

Patent document 1 describes separate supply sections for supply of fluidizing gas, carbon source gas and catalyst source gas. It is assumed that these three types of gas are continuously supplied, and nothing is mentioned regarding the gas switching procedure. Moreover, since the catalyst attaches to the carbon nanotubes in the method of Patent document 1, impurities contaminate the product. Furthermore, the method of Patent document 1 does not allow removal of carbon precipitates remaining in the fluidized bed, and they accumulate there. As a result, before a large number of carbon nanotubes are obtained, the particles used as the fluidizing medium become covered with carbon and are unusable.

Thus, it is not possible to produce high-purity carbon nanotubes by conventional fluidized bed production methods. The productivity is also low. Since the carbon nanotube synthesis and catalyst loading are carried out simultaneously, it is difficult to achieve high-level control of the catalyst.

The present invention has been accomplished in light of this technical background, and it achieves the following objects. One object of the invention is to provide a method for producing carbon nanotubes that allows large-scale, low-cost production of carbon nanotubes.

Another object of the invention is to provide a method for producing carbon nanotubes wherein a substrate-supported catalyst is developed into the three-dimensional space of a CVD reactor to combine the advantages of both a gas-phase dispersed catalyst and a substrate-supported catalyst.

Yet another object of the invention is to provide a method for producing carbon nanotubes wherein production of carbon nanotubes is semi-continuous while maintaining the reactor in a heated state, and specifically, wherein a support is used and loading of the catalyst, growth of carbon nanotubes and recovery of the carbon nanotubes are carried out repeatedly.

Still yet another object of the invention is to provide an apparatus for producing carbon nanotubes that can be suitably used for the aforementioned method for producing carbon nanotubes.

Solution to Problem

In order to achieve the objects stated above, the invention provides a method for producing carbon nanotubes wherein a carbon source that contains carbon and is decomposed when heated and a catalyst that serves as a catalyst for production of carbon nanotubes from the carbon source, are used to synthesize carbon nanotubes on a heated support placed in a reactor, the method comprising a catalyst loading step in which the catalyst starting material, as the starting material for the catalyst, is distributed over the support to load the catalyst onto the support, a synthesis step in which the carbon source is distributed over the support to synthesize the carbon nanotubes on the support, and a separating step in which a separating gas stream is distributed over the support to separate the carbon nanotubes from the support, wherein the catalyst loading step, the synthesis step and the separating step are carried out while keeping the support in a heated state and switching supply of the catalyst starting material, the carbon source and the separating gas stream.

In the method for producing carbon nanotubes of the invention, the support preferably has a gas passage with a width of between 10 µm and 10 mm inside or surrounding the support. The support is preferably a structure selected from among particles, wires, meshes, flat plates and honeycombs. Preferably, the support consists of particles, and the carbon nanotube synthesis is carried out in a fluidized bed state, growing the carbon nanotubes while releasing the carbon nanotubes from the support, with the synthesis step and separating step being carried out simultaneously.

In the method for producing carbon nanotubes according to the invention, the catalyst loading step, synthesis step and separating step are preferably carried out with the support kept at a temperature of at least 100° C. and no higher than 1200° C. The change in temperature of the support during the catalyst loading step, the synthesis step and the separating step is preferably no more than 500° C.

Also, in the method for producing carbon nanotubes according to the invention, the catalyst loading step, synthesis step and separating step are preferably carried out repeatedly, with the support kept in a heated state and while switching supply of the catalyst starting material, the carbon source and the separating gas stream. The repeating cycle is preferably a time period of at least 10 seconds and no longer than 10 hours. Preferably, a time period which is at least 10% and no longer than 99.99% of the time period of the repeating cycle is used for the carbon nanotube synthesis. After the separating step, preferably the support is subjected to oxidizing treatment to remove the carbon remaining on the support, and then the catalyst loading step is carried out for the next cycle period.

In the method for producing carbon nanotubes according to the invention, the catalyst loading step and synthesis step are preferably carried out at separate times.

Also, the catalyst used in the method for producing carbon nanotubes according to the invention preferably comprises a carrier layer and catalyst particles. Preferably, vapor containing one or more elements from among Si, Al, Mg, O, C and N is supplied to load the carrier layer on the support to a mean film thickness of between 1 nm and 100 nm. Also preferably, vapor containing one or more elements from among Fe, Co, Ni and Mo is supplied to load the catalyst particles having a diameter of between 0.4 nm and 15 nm on the support. It is also preferred to load the carrier layer and the catalyst particles on the support simultaneously, or to load the carrier layer on the support and then load the catalyst particles onto the carrier layer on the support.

In the method for producing carbon nanotubes according to the invention, the carbon source is preferably one containing at least one compound selected from among alkynes, alkenes, alkanes, alcohols, ethers, aldehydes, ketones, aromatic compounds and carbon monoxide. The carbon nanotube synthesis is preferably carried out with the gas containing the carbon source being distributed over the support at a pressure of between 0.001 MPa and 1.013 MPa.

In the method for producing carbon nanotubes according to the invention, the carbon nanotubes separated from the support by the separating gas stream are preferably recovered by recovering means.

The diameter of the carbon nanotubes used in the method for producing carbon nanotubes of the invention is preferably between 0.4 nm and 10 nm.

The carbon nanotubes used in the method for producing carbon nanotubes of the invention are preferably carbon nanotubes comprising between 1 and 10 walls.

The invention further provides an apparatus for producing carbon nanotubes wherein a carbon source that contains carbon and is decomposed when heated and a catalyst that serves as a catalyst for production of carbon nanotubes from the carbon source, are used to synthesize carbon nanotubes on a heated support placed in a reactor, the apparatus for producing carbon nanotubes being one which produces the carbon nanotubes by repetition of a catalyst loading step in which the catalyst starting material, as the starting material for the catalyst, is distributed over the support to load the catalyst onto the support, a synthesis step in which the carbon source is distributed over the support to synthesize the carbon nanotubes on the support, a separating step in which a separating gas stream is distributed over the support to separate the carbon nanotubes from the support, and a removing step in which the carbon remaining on the support is removed by distributing an oxidizing agent over the support for oxidizing treatment, and the apparatus for producing carbon nanotubes comprising a switching supplier that supplies the catalyst starting material, the carbon source, the separating gas stream and the oxidizing agent over the support while switching them.

[Definition of Terms]

The terms used throughout the specification and the claims of the present invention will now be defined.

"Carbon nanotubes" refers to a microstructure having graphene sheets rolled into a tubular shape.

"Support" means a structure for supporting a catalyst, catalyst carrier (defined hereunder) or the like in a reactor, and it is made of a solid material. The catalyst can be loaded by gasification of the catalyst starting material and contact of the gaseous starting material on the support.

A "catalyst" is a common catalyst which is supported on a support. When the carbon source is supplied to the "catalyst" to synthesize carbon nanotubes, the "catalyst" functions to mediate, promote and increase the efficiency of carbon nanotube synthesis, so that carbon nanotubes are synthesized from the carbon material. A "catalyst" is a material that performs the role of taking up a carbon source and discharging carbon nanotubes. "Catalyst" also refers to nanoparticles having sizes on the nanometer order.

"Catalyst support" is a material having catalyst nanoparticles adhered to it. A "catalyst carrier" is formed on a support, with a metal nanoparticle catalyst loaded thereover. The support can also serve the function as the catalyst carrier.

"Carbon nanotube synthesis" refers to growth of carbon while forming a tubular structure on the catalyst. "Carbon nanotube growth" is used as a synonym for carbon nanotube synthesis.

"Reactor" is an apparatus in which the support is placed, and it is a sealed apparatus connected to a supply tube for supply of gas streams including the catalyst carrier starting material, the catalyst starting material, the carbon source, the carrier gas and separating gas stream, and connected to an outlet tube for discharge of the gas streams after synthesis.

"Switching of gas streams" means that the catalyst carrier starting material, the catalyst starting material, the carbon source and the separating gas stream are supplied to the reactor at separate times.

"Repeatedly" means that the catalyst carrier loading, catalyst loading, carbon nanotube synthesis and carbon nanotube separation necessary for carbon nanotube synthesis, as a single cycle, are carried out repeatedly. At least the catalyst loading and carbon nanotube synthesis are carried out at separate times. These steps and carbon nanotube separation are carried out repeatedly.

"Carbon nanotube separation" means that the carbon nanotubes synthesized on the catalyst are separated from the catalyst and support by a separating gas stream, and recovered.

"Carbon nanotube recovery" means separation of the carbon nanotubes alone from the separating gas stream.

"Regeneration of the support" means that the catalyst carried on the support, that has been degraded, inactivated or consumed by production of the carbon nanotubes, is treated either periodically or non-periodically during production, to regenerate its catalyst function. Specifically, when the catalyst function has been reduced due to carbonization or oxidation of the catalyst particles, the carbon is removed from the catalyst particles by oxidizing treatment, and the catalyst particles are converted to their reduced state by reduction treatment to regenerate their catalyst function. However, regeneration of the catalyst is limited because of the problem of aggregation and residue of the catalyst particles. "Reloading of the catalyst", defined hereunder, is included in the support regeneration treatment.

"Reloading of the catalyst" is loading and covering of the carrier on the aggregated catalyst particles to reload the catalyst particles. Reloading of the catalyst allows repeated synthesis of carbon nanotubes on the support.

The production method of the invention accomplishes loading of the catalyst onto the support and production and separation of the carbon nanotubes, while maintaining a high reactor temperature, to synthesize carbon nanotubes.

The preferred production method of the invention is repeated production and separation of the carbon nanotubes and reloading of the catalyst while maintaining a high reactor temperature, for semi-continuous synthesis of carbon nanotubes. Specifically, a support is used for repeated catalyst loading, carbon nanotube growth and carbon nanotube separation, for semi-continuous production of carbon nanotubes.

Each of the main elements of the method for producing carbon nanotubes according to the invention will now be explained.

[General Description]

The method for producing carbon nanotubes according to the invention is a method wherein a support is used for catalyst loading (catalyst loading step), carbon nanotube growth (synthesis step) and carbon nanotube separation (separating step), with the support kept in a heated state, and preferably each step is carried out in a repeated manner. The invention is not a continuous system wherein the catalyst loading, carbon nanotube growth and carbon nanotube recovery are carried out continuously. The carbon nanotube synthesis is repeated by changing each step while switching gas streams, which may be considered "semi-continuous synthesis". According to the invention, the carbon nanotubes are synthesized by a thermal CVD process. The thermal CVD process is a process wherein the starting material that has been gasified by high temperature undergoes chemical reaction in a vapor gas phase or on a substrate surface to form a solid material.

Supplying energy that produces this chemical reaction in the form of heat energy from the substrate or reactor walls, is known as thermal CVD. It is particularly preferred to change the manner of setting the support, depending on differences in the condition of the support used. When a wire, mesh, flat plate or honeycomb is used as the support, the support is set anchored in the reactor and heated to high temperature. The catalyst starting material, etc. is supplied to the surface to load the catalyst onto the surface of the support, and the carbon source, etc. is supplied for carbon nanotube synthesis.

When particles are used as the support, the reactor is filled with the particles. The gases including the catalyst starting material, carbon source, etc. are distributed throughout the particle layer comprising the particles, to load the catalyst onto the particle surfaces in a fixed bed state or fluidized bed state, for carbon nanotube synthesis. Particularly in the case of fluidized bed thermal CVD, the support particles form a fluidized state in the reactor by the carrier gas, etc. The catalyst starting material, carbon source, etc. is supplied into this atmosphere to load the catalyst onto the surface of the support, for carbon nanotube synthesis. In this case, the support used may be particles having a weight such that they are not eliminated from the reactor together with the gas streams.

For fluidized bed thermal CVD, preferably the carbon nanotubes are removed off while they are grown, so that synthesis and separation are accomplished simultaneously. The reactor used may be an entrained flow reactor, a fixed bed reactor, a moving bed reactor, a fluidized bed reactor, or the like. The catalyst loading and the carbon nanotube synthesis are preferably carried out at separate times. This will reduce contamination of the product with the catalyst starting material gas, catalyst and other components. After carbon nanotube separation, the support may be subjected to oxidizing treatment to remove the non-separated carbon nanotubes or the residual carbon such as graphite and amorphous carbon by-products, prior to reloading of the catalyst.

All or a portion of the carbon source, catalyst source, carrier source, oxidizing agent and carrier gas supplied to the reactor may be supplied to the reactor at ordinary temperature. Alternatively, all or a portion of the carbon source, catalyst source, carrier source, oxidizing agent and carrier gas supplied to the reactor may be preheated and heated. They may also be heat-exchanged with the exit gas eliminated from the reactor, for preheating and heating. This can prevent lowering of the support temperature. After the carbon nanotubes have been separated by the separating gas stream, the carbon nanotubes may be recovered by recovering means such as a cyclone collector, filter, thermophoresis system or scrubber.

[Reaction Temperature]

Each step and its repetition are preferably carried out with the support kept at a temperature of between 100° C. and 1200° C. Also, each step and its repetition are preferably carried out with a support temperature variation of no greater than 500° C. The preferred lower limit for the support temperature is 100° C. because liquid water is not to be used during the steps such as the catalyst loading and carbon nanotube separation. If liquid water is used, the time and thermal loss will significantly increase for adjustment of the carbon nanotube synthesis conditions. The preferred upper limit for the support temperature is 1200° C. to ensure that it is below the temperature at which the carbon source is thermally decomposed to soot. This temperature will differ depending on the carbon source.

Several examples of thermal decomposition temperatures will now be mentioned. For low-reactive aromatic compounds or methane, it is about 1200° C. For other alkanes, it is about 1000° C. For highly reactive alcohols, alkenes and alkynes, it is about 900° C. Although a smaller variation in the support temperature is preferred, variation of about 500° C. is produced by combustion of the residual carbon, for example. A temperature variation of about 500° C. produces minimal time loss.

[Reaction Time]

The repeating cycle may be a time period of at least 10 seconds and no longer than 10 hours. The repeating cycle for the synthesis time may be between 10% and 99.99% of the cycle period. The repeating cycle for the separation and catalyst reloading may be several tens of seconds. The time range for synthesis will differ depending on the intended carbon nanotube length. A longer synthesis time will allow synthesis of longer carbon nanotubes. The synthesis time may be determined according to the type of material and the required lengths of the carbon nanotubes, and is not limited to the values mentioned above. Similarly, the time required for carbon nanotube separation, reloading of the catalyst and regeneration of the support may also be determined according to the type of material and the heating temperature, and is not limited to the value mentioned above.

[Support]

The support may be one that allows a maximal support surface area. However, if a microstructure of smaller than 1 μm is formed into a support to increase the surface area of the support, the microstructure will become rapidly obstructed by the carbon nanotubes and it will be difficult to recover the carbon nanotubes from the microstructure, such that essentially no effect will be obtained. The support therefore preferably has a gas passage with a width of between 10 μm and 10 mm in its interior or perimeter.

That is, with a passage having a width of between 10 μm and 10 mm, a large surface area of the exposed support is maintained while resistance is reduced, facilitating carbon nanotube recovery by distribution of gas. As mentioned above, the support preferably has a large surface area per unit volume, and specifically it preferably has a specific surface area of at least $0.1 \text{ mm}^2/\text{mm}^3$, as the surface excluding the surface due to the microstructure smaller than 1 μm. Most preferably, the support has a specific surface are of between 1 $\text{mm}^2/\text{mm}^3$ and 1000 $\text{mm}^2/\text{mm}^3$. Also, the support may be, for example, a honeycomb structure, as a known structure comprising an arrangement of square pipes with quadrilateral cross-sectional shapes.

Instead of a honeycomb structure, it may be an arrangement of a plurality of plate materials, an arrangement of corrugated plate materials, a structure comprising an arrangement of rectangular pipes with rectangular cross-sections, or the like. The support may be a wire, mesh or flat plate structure, and such supports may be utilized in a form that is anchored in the reactor. The support may also consist of particles. In the case of particles, they are filled into the reactor and used in a fixed bed state or fluidized bed state. They are most preferably used in a fluidized bed state, to allow uniform mixing and to allow the carbon nanotubes to separate from the particles by friction between the particles during carbon nanotube synthesis.

A ceramic is preferably used as the support material for satisfactory heat resistance, corrosion resistance, chemical resistance and mechanical strength properties. The support used may be an oxide-based, nitride-based or silicon carbide-based ceramic containing one or more elements selected from among O, N, C, Si, Al, Zr and Mg. However, the support is not limited to a ceramic, and there may be used a metal material comprising a metal or alloy including one or more elements selected from among W, Ta, Mo, Ti, Al, Fe, Co and Ni, or carbon. The support most preferably consists of alumina beads.

Heating of the support may be accomplished by the following method. The support is heated to raise the temperature of the catalyst, and the carbon source-containing source gas is supplied for carbon nanotube synthesis. The support may be heated by means of direct heating or indirectly heating of the support. Most preferred is means in which the support is placed in a heating furnace that has been heated to high temperature. Specifically, according to the invention, the carbon nanotubes are synthesized by a thermal CVD process. Thermal CVD is a process wherein a thin-film is formed by chemical reaction in a gas, or in a vapor gas phase of a gasified liquid starting material, or on a substrate surface.

Supplying energy that produces this chemical reaction in the form of heat energy from the substrate or reactor walls, is also known as thermal CVD. The heating method may be heating of the entire reactor with a heating furnace for synthesis of the carbon nanotubes. The carbon nanotubes may also be synthesized by electrified heating of the support. That is, instead of heating the entire reactor with a heating furnace, the support may be subjected to electrified heating for synthesis of the carbon nanotubes.

[Carrier and its Supply]

The catalyst carrier (carrier layer) comprises one or more elements selected from among Si, Al, Mg, O, C and N. For example, the catalyst carrier may be formed of an oxide such as $SiO_2$, $Al_2O_3$ or MgO, a nitride such as $Si_3N_4$ or AlN, or a carbide such as SiC. An $Al_2O_3$—$SiO_2$ complex oxide is particularly preferred. The starting material for the catalyst carrier is supplied into the reactor in gaseous form. If the catalyst carrier starting material is liquid or solid at ordinary temperature, it may be gasified for supply into the reactor in a gaseous state. The supplied gaseous catalyst carrier starting material contacts with the support and becomes loaded thereon, forming a catalyst carrier on the support.

When the entire reactor is heated by a heating furnace, a liquid or solid catalyst carrier starting material at ordinary temperature may also be supplied directly into the reactor. These starting materials become vaporized by the heat of the heated reactor. They are therefore supplied as gaseous starting material onto the support. The catalyst carrier and catalyst may also be loaded simultaneously. The catalyst carrier may have a mean film thickness of between 1 nm and 100 nm. Reloading of the catalyst carrier is accomplished by supplying the catalyst carrier starting material in the gaseous state, into the heated atmosphere in the same manner as loading of the catalyst carrier. Reloading of the catalyst carrier may also be accomplished by simultaneous loading of the catalyst carrier and catalyst.

[Catalyst]

The catalyst may comprise at least one element selected from among Fe, Co, Ni and Mo among its components. The catalyst is formed on the catalyst carrier. The diameter size of the catalyst is preferably between 0.4 nm and 15 nm. The catalyst is preferably Fe or Co.

The combination of the catalyst carrier and catalyst is preferably $Al_2O_3$ as the catalyst carrier and Fe as the catalyst, from the viewpoint of productivity of carbon nanotubes. From the viewpoint of efficiently obtaining carbon nanotubes with small diameters, preferably the catalyst carrier is $Al_2O_3$ and the catalyst is Co.

The catalyst of the invention is prepared in the following manner. The catalyst of the invention can be loaded by gasifying the catalyst starting material and contacting it onto the support. The catalyst is supplied into the reactor in gaseous form. The catalyst may be supplied by feeding a liquid or solid starting material to the reactor at ordinary temperature, and vaporizing the starting material by the heat of a heated atmosphere in the reactor. The catalyst is loaded by contacting the support with the gaseous starting material obtained by gasification of the catalyst starting material. When the support does not have a catalyst-carrying function, the catalyst carrier is loaded onto the support and the catalyst is loaded onto the loaded catalyst carrier.

When the support has a catalyst-carrying function, the catalyst is loaded directly onto the support. Reloading of the catalyst may also be accomplished by simultaneous loading of the catalyst carrier and catalyst. Prior to reloading, the catalyst-loaded support is preferably subjected to regeneration treatment. The support regeneration treatment may be carried out periodically or non-periodically. The support regeneration treatment may also include oxidizing treatment to remove the carbon nanotubes remaining during separation or the graphite/amorphous carbon by-product. Most of the catalyst remains on the carrier during separation of the synthesized carbon nanotubes.

When carbon nanotube synthesis is continued, the catalyst nanoparticles aggregate and lose their catalytic function. Aggregation of the catalyst nanoparticles can lead to alteration in the properties of the carbon nanotubes synthesized on the catalyst. The catalyst carrier is therefore loaded on the inactivated catalyst and the catalyst is loaded thereon, to regenerate the function of a catalyst-loaded support. The oxidizing treatment may be a method of distributing a gas comprising oxygen as an element onto the heated support.

When the support is regenerated with reloading of the catalyst carrier and catalyst by this method, the catalyst carrier and catalyst become multilayered to a sufficient thickness, and the catalyst activity is maintained or improved while facilitating separation of the carbon nanotubes from the support. Thus, repeated carbon nanotube synthesis is accomplished by the method of the invention, thus allowing production of carbon nanotubes with high productivity.

[Carbon Source and its Supply]

The carbon source may comprise one or more selected from among alkynes, alkenes (olefin hydrocarbons), alkanes (paraffin hydrocarbons), alcohols, ethers, aldehydes, ketones, aromatic compounds and carbon monoxide. The carbon source may be supplied to the reactor in gaseous form. The carbon source may be supplied by feeding a liquid or solid starting material to the reactor at ordinary temperature, and vaporizing the starting material by the heat of a heated atmosphere in the reactor.

Thermal CVD is carried out by circulating a carbon source-containing gas at between 0.001 MPa (0.01 atm) and 1.013 MPa (10 atm). Specifically, the carbon source-containing gas is supplied to the catalyst at between 0.001 MPa (0.01 atm) and 1.013 MPa (10 atm) for carbon nanotube synthesis. The carbon source vapor is mixed with a carrier gas such as hydrogen, argon or nitrogen for supply to the catalyst.

[Product]

The diameters of the carbon nanotubes may be between 0.4 nm and 10 nm. The carbon nanotubes diameters are determined by the catalyst type and size, and are not limited to the values mentioned above. The carbon nanotube lengths are determined by the synthesis time, and the synthesis time is shortened for purposes requiring short carbon nanotubes. For purposes requiring long carbon nanotubes, the synthesis time is lengthened.

The carbon nanotubes may have a single-walled or multi-walled structure. The carbon nanotubes may comprise between 1 and 10 walls. The method for producing carbon nanotubes according to the invention may be a method for production of carbon nanotubes with various structures, which is suitable for production of SWCNT. Controlling the size and components of the catalyst will allow production of carbon nanotubes with various structures. In methods of the prior art it has been difficult to efficiently produce SWCNT, but the production method of the invention allows drastic improvement to be achieved in production efficiency of SWCNT.

[Separation and Recovery]

The synthesized carbon nanotubes become layered or retained on or near the surface of the catalyst, catalyst carrier and support, and they must be separated to obtain the carbon nanotubes alone. Separation of the synthesized carbon nanotubes may be accomplished by a nonstationary gas pulse or stationary separating gas stream. A nonstationary gas pulse is creation of a pulse flow of an inert gas such as argon or nitrogen, with the flow rate in a fixed period. A stationary gas stream is an inert gas stream with a fixed flow rate.

The synthesized carbon nanotubes layered or retained at or near the surface of the catalyst, catalyst carrier and support, are separated by the dynamic pressure of the separating gas stream. The kinetic energy of a fluid with a given density and speed has a pressure dimension, which is the dynamic pressure. The carbon nanotubes can be recovered from gas containing the carbon nanotubes separated by the dynamic pressure, using appropriate recovering means. The recovering means used may be a filter, cyclone or the like. In the case of a filter, the gas containing the carbon nanotubes separated by dynamic pressure may be filtered with the filter to collect the carbon nanotubes on the filter.

In the case of a cyclone, the difference in inertia force in a cyclone-type separator is used to separate and recover the carbon nanotubes from the gas containing the carbon nanotubes separated by dynamic pressure. Also, the gas containing the separated carbon nanotubes may be contacted with a liquid to collect the carbon nanotubes in the liquid. Alternatively, the gas containing the separated carbon nanotubes may be contacted, using a gas stream, with a solid wall or liquid wall at a lower temperature than the temperature of the gas stream, and the carbon nanotubes collected by thermophoresis.

[Production Steps]

The following is a summary of the method for producing carbon nanotubes according to the invention. It is a feature of the invention that carbon nanotubes can be synthesized in large amounts and in a semi-continuous manner, for production of carbon nanotubes. First, a solid support with a large specific surface area is prepared (first step). A catalyst carrier is also loaded on the support (second step). The support can also serve as the catalyst carrier. In addition to a method of supplying the carrier starting material vapor and forming a catalyst carrier layer, for example, the surface of the support may be subjected to oxidizing treatment to form an oxidation layer, to also serve as the catalyst carrier.

The nanoparticle catalyst is then loaded on the catalyst carrier (third step). The catalyst on the support is heated, and the carbon source, as a volatile compound mixed with carrier gas or the like, is supplied while growing carbon nanotubes (fourth step). Following the carbon nanotube synthesis, the carbon nanotubes deposited or retained at or near the surface of the catalyst, catalyst carrier and support are separated by blowing a separating gas such as an inert gas (fifth step). The separating gas is blown in a repeating pulse with a fixed period, or it is blown in at a constant speed. The separated carbon nanotubes are recovered with appropriate recovering means (sixth step).

Next, the support to which the nanoparticle catalyst is attached is regenerated (seventh step). That is, reloading of the catalyst on the support is carried out for repeated reuse of the support. However, regeneration of the support may be carried out in periodical or non-periodical intervals. In other words, regeneration of the support is preferably carried out as necessary. The support may be regenerated when the catalytic function of the catalyst has been reduced after repeating carbon nanotube synthesis and recovery several times. The catalyst on the support is heated, and the carbon source is supplied while growing carbon nanotubes, in the cycle described above (fourth step). Thus, the nanoparticle catalyst-attached support is regenerated for semi-continuous carbon nanotube synthesis.

The present invention may be considered a synthesis method combining method A and method B, described under Background Art. In other words, it is a method wherein a supported catalyst of method B is prepared using a support with a large specific surface area, to simulate development of the two-dimensional space to the three-dimensional space. Also, the catalyst loading, synthesis and separating steps are carried out repeatedly with switching at different time points. During the switching and repeating, the support is kept in a heated state. Consequently, the carbon nanotubes can be produced essentially continuously, or strictly speaking, "semi-continuously".

The invention supplies the carbon source and the catalyst starting material and/or carbon removal gas streams while the support is in a heated state, switching them at different time points. By thus switching the gas streams, it is possible to prevent contamination of the product carbon nanotubes with the catalyst. The carbon source and the catalyst starting material may both be supplied from a single supply section. The number of supply tubes for gas supply can thus be minimized to contribute to cost reduction. According to the invention, the impurities are limited to no greater than 0.1% as demonstrated by Example 1 below.

In Example 1, a carrier layer with a mean film thickness of 20 nm and a catalyst with a mean film thickness of 1 nm are loaded, and then carbon nanotubes are grown to a length of about 0.5 mm. During carbon nanotube separation, almost all of the catalyst remains on the support. Based on specific gravity ratio, the impurities other than carbon are limited to no greater than 0.1%.

ADVANTAGEOUS EFFECTS OF INVENTION

The method for producing carbon nanotubes according to the invention exhibits the following effects. Since the invention employs a support with a large area per unit volume, it has high space utilization and is suitable for large-scale production of carbon nanotubes. The structure of the support inhibits pressure loss and is suitable for high-speed flow of gas. Thus, the carbon nanotubes can be easily separated and recovered from the support by a nonstationary gas pulse or stationary gas stream, and contamination of the produced carbon nanotubes by the catalyst can be minimized.

In addition, by providing a method for reloading of the catalyst onto the support, it is possible to accomplish repeated synthesis of carbon nanotubes. As a result of repetition of a cycle of loading the catalyst with the support in a heated state, growing the carbon nanotubes and recovering the carbon nanotubes, there is no need to raise or lower the temperature of the reactor for each synthesis and recovery, and therefore time can be saved and productivity vastly improved.

Also, since the cycle described above is repeated with the support in a heated atmosphere, the problem whereby the catalyst floating in the gas phase and the carbon nanotubes flow out together with the exhaust gas, which occurs in the prior art, can be ameliorated. This improves the drawbacks of not increased number density of the catalyst due to the floating catalyst, and recovery of the carbon nanotubes and catalyst in a mixed state. In addition, the carbon nanotube production efficiency is drastically increased compared to prior art production technology.

BRIEF DESCRIPTION OF DRAWINGS

FIG. 2(a) shows particles as the support and FIG. 2(b) shows an anchored substrate as the support.

FIG. 7 is a set of optical microscope photographs taken of the alumina beads of synthesized carbon nanotubes for Example 1 of the invention, wherein FIG. 7(a) is a photograph taken of numerous alumina beads, FIG. 7(b) is a photograph of a carbon nanotube grown in a perpendicular orientation from half-surface of an alumina bead, taken from the direction of the tip, and FIG. 7(c) is a photograph of a carbon nanotube grown in a perpendicular orientation from half-surface of an alumina bead, taken from the side.

FIG. 9 is a set of photographs showing the results of observing the alumina beads of Example 1 of the invention using a scanning electron microscope, wherein FIG. 9(a) shows a state of oriented growth with the carbon nanotubes aligned, FIG. 9(b) is a magnified photograph of the tip sections of a group of carbon nanotubes, and FIG. 9(c) is a further magnified photograph of the tip sections of a group of carbon nanotubes.

FIG. 11 is a set of photographs showing the repeated carbon nanotube synthesis in Example 3 of the invention, wherein FIG. 11(a) is a photograph showing the condition after oxidation removal of carbon nanotubes adhering to alumina beads upon completion of the first cycle, FIG. 11(b) is a photograph taken during the second cycle, and FIG. 11(c) is a photograph showing the condition of carbon nanotubes grown on alumina beads after synthesis of the carbon nanotubes during the second cycle.

FIG. 14 is a set of photographs showing the carbon nanotubes recovered in Example 4, wherein FIG. 14(a) shows the collector before recovery of the carbon nanotubes, FIG. 14(b) shows the yield of carbon nanotubes recovered in the first cycle, FIG. 14(c) shows the yield of carbon nanotubes recovered in the second cycle, FIG. 14(d) shows the yield of carbon nanotubes recovered in the third cycle, FIG. 14(e) shows the yield of carbon nanotubes recovered in the fourth cycle, and FIG. 14(f) shows the total amount of carbon nanotubes recovered in the first to fourth cycles.

EXPLANATION OF SYMBOLS 1, 21: Reactor, 2: porous board, 3: support (particles, anchored substrate), 4, 24: heater, 14: carrier, 15: catalyst, 7: cyclone, 22: boat.

DESCRIPTION OF EMBODIMENTS

Figure 1:
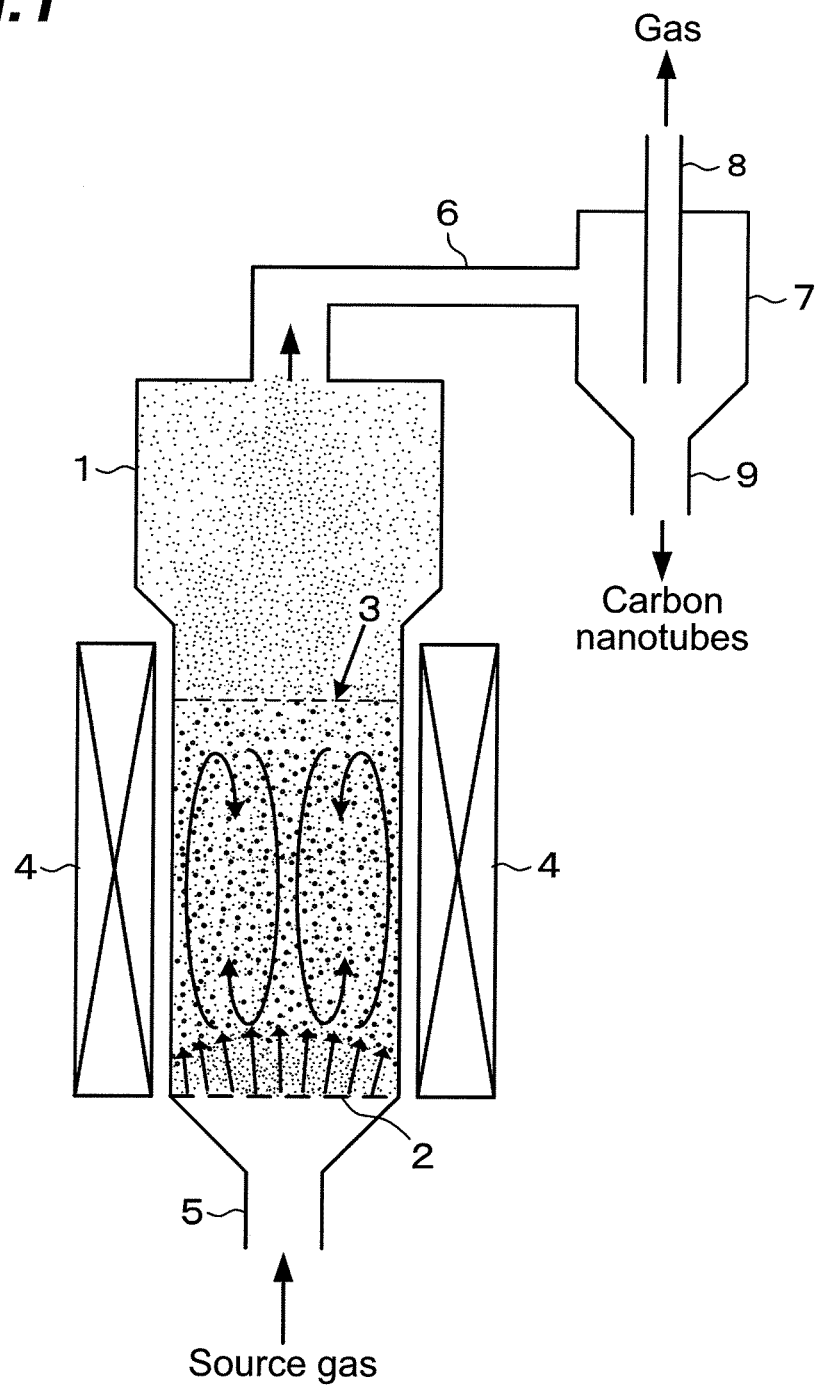
FIG. 1 is a schematic diagram showing an overview of an apparatus for producing carbon nanotubes according to an embodiment of the invention.

Embodiments of the invention will now be explained in detail. FIG. 1 is a conceptual drawing showing an overview of an embodiment of the invention. FIG. 1 is a schematic diagram of an apparatus for producing carbon nanotubes of the invention for production of carbon nanotubes. As shown in FIG. 1, the apparatus for producing carbon nanotubes of the invention comprises a reactor 1 arranged in a vertical manner, heater 4 and cyclone 7. The reactor 1 is a reactor for synthesis of carbon nanotubes. The top of the reactor 1 has a thicker diameter, while the bottom is partitioned by the porous board 2. The porous board 2 comprises numerous holes.

A supply tube 5 is connected at the bottom of the reactor 1 for supply of gas. Gas is supplied through the supply tube 5 and fed into the reactor 1 through the holes in the porous board 2. The gas supplied is a source gas such as the carrier starting material vapor, catalyst starting material vapor or carbon source, or a carrier gas such as hydrogen, argon or nitrogen. However, separate supply tubes may be provided at the sides or top of the reactor to supply a portion of the source gas, carrier gas, etc.

An outlet tube 6 is connected at the top of the reactor 1 for gas discharged from the reactor 1. Support particles 3 are introduced to fill the reactor 1. The particles 3 introduced into the reactor 1 are represented as points in FIG. 1. A heater 4 is provided covering the exterior of the reactor 1. When the heater 4 is driven, it releases heat and the particles 3 are heated by heat conduction, to a prescribed temperature. As illustrated in FIG. 1, a cyclone 7 serves to separate the carbon nanotubes from the gas discharged from the reactor 1.

Figure 2:
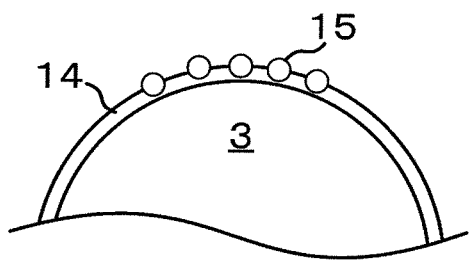
FIG. 2 is a pair of conceptual drawings showing an overview of a nanoparticle catalyst formed on a support according to an embodiment of the invention, where
Figure 2:
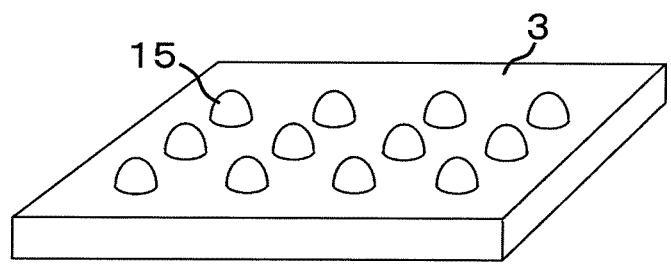

The outlet tube 6 connected to the reactor 1 is also connected to the cyclone 7. This causes the gas discharged from the reactor 1 to be supplied to the cyclone 7. When the carrier starting material vapor and catalyst starting material vapor are circulated with the particles 3 in a heated state, catalyst is formed on the particles 3. FIG. 2(a) shows a conceptual drawing of a catalyst-attached particle 3. As illustrated in FIG. 2(a), a laminar carrier (carrier layer) 14 and a spherical catalyst 15 partially embedded in the carrier 14, are formed on the particle 3. The catalyst 15 consists of nanoparticles with particle sizes of 0.4 nm-15 nm. Because the particles 3 are heated, the carrier 14 and catalyst 15 formed thereon are also heated.

Supplying the carbon source thereto causes synthesis and growth of carbon nanotubes on the catalyst 15. The carbon source vapor is conveyed from the bottom of the reactor 1 as source gas together with carrier gas such as hydrogen, argon or nitrogen, and the carbon source is supplied for a prescribed time period for carbon nanotube synthesis. Following the carbon nanotube synthesis, the carbon nanotubes are separated and recovered from the particles 3. A separating gas is supplied into the reactor 1 through the supply tube 5 for separation of the carbon nanotubes from the particles 3. The flow speed of the separating gas must be of a strength that causes separation of the carbon nanotubes from the particles 3, i.e. the catalyst 15.

Supply of the separating gas is accomplished by repeating alternate supply of the separating gas and cutoff of supply, or in other words, by a pulse flow. Since the carbon nanotubes are separated by lower flow speed the longer their grown lengths, it is possible to distribute the source gas at a fixed speed and separate long carbon nanotubes from the particles. The gas used for synthesis of the carbon nanotubes may also be given the function of a separating gas. The carbon nanotubes entrained in the separating gas are recovered through the cyclone 7 as carbon nanotubes. The difference in inertial force is utilized for separation and recovery of the carbon nanotubes from the gas supplied to the cyclone 7. The separating gas is discharged from a first outlet 8 of the cyclone 7, and the carbon nanotubes are discharged from a second outlet 9.

When carbon nanotube synthesis is carried out in the reactor 1 not in a fixed bed state but in a fluidized bed state, friction caused by collision between the particles 3 causes release of the carbon nanotubes, thus suitably allowing separation of the carbon nanotubes in a stationary manner during synthesis. The separated carbon nanotubes entrained in the gas stream are recovered through the cyclone 7.

Figure 3:
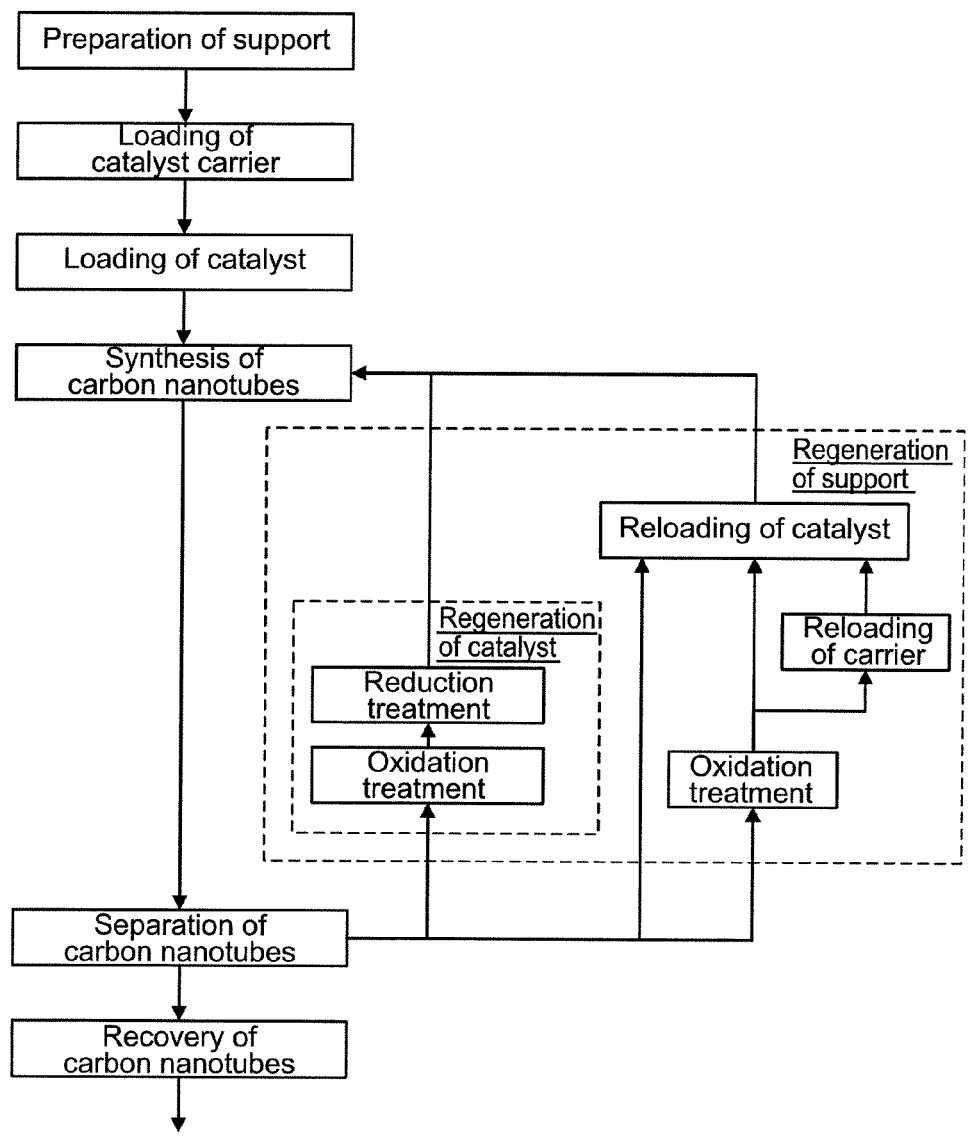
FIG. 3 is a diagram illustrating the process flow for synthesis of carbon nanotubes.

FIG. 3 shows the process flow for synthesis of carbon nanotubes.

The entire process comprises steps for preparation of the support, loading of the catalyst carrier, loading of the catalyst, carbon nanotube synthesis, carbon nanotube separation, carbon nanotube recovery and catalyst regeneration. Each of the steps will now be explained in detail.

Various modified modes exist, depending on the type of support and catalyst. This embodiment employs bead-like particles, as an example of the support. The specific surface area of the support is a major factor determining productivity in carbon nanotube synthesis. However, even if the specific surface area is increased in a nanometer scale microstructure, the reaction rate is determined by the speed of contact of the reacting gas starting material with the support, as the rate-determining factor for diffusion of the gas starting material, and therefore only part of the surface can be exploited.

A nanometer scale microstructure rapidly loses its function as it becomes obstructed by the growing carbon nanotubes, and this interferes with recovery of the carbon nanotubes formed in the micropores. It also impedes distribution of gas through the support. It is therefore essential to obtain a specific surface area with a structure having the same size scale as the gas boundary film, while ensuring a gas fluid channel. It has been customary in the past to use a single substrate as the support. A substrate has a two-dimensional structure and facilitates gas passage, while only a very small portion of the three-dimensional space of the reactor is utilized. By filling the reactor with particles instead of a substrate, it is possible to increase the surface area while ensuring gas fluid passage.

For example, when $N^3$ particles of diameter d are filled, the surface area is $\pi d^2 N^3$, which allows an increase of 4N times greater than the surface area of $\pi N^2 d^2/4$ with placement of a single disc of diameter Nd. Bead-like particles therefore have the ideal structure from this viewpoint as well. The particles are composed of ceramic with diameters of about 0.2 mm-2 mm, and with a diameter d, the specific surface area is $(\pi d^2)/(\pi d^3/6)=6/d$ [mm$^2$/mm$^3$], or 12 [m$^2$/mm$^3$] if d=0.5 [mm]. On the other hand, since the gaps between the particles are about the same sizes as the particles, an adequate gas passage width of between 10 μm and 10 mm can be ensured.

[Loading of Carrier and Catalyst]

The carrier starting material vapor is distributed while heating the reactor filled with particles as the support, and the carrier accumulates to cover the support. The support can also be given a carrier function, in which case it may not be necessary to load a carrier. The catalyst starting material vapor is then distributed to load the nanoparticles as the catalyst. The carrier starting material vapor and catalyst starting material vapor may be supplied simultaneously for simultaneous loading of the carrier and catalyst.

During this time, the catalyst segregates on the carrier, naturally forming catalyst nanoparticles on the carrier. Incidentally, although the carrier and catalyst can be loaded with the support particles in a fixed bed state, loading of the carrier and catalyst with the support particles in a fluidized bed state will permit uniform admixture of the support particles, which is preferred for more homogeneous loading of both the carrier and catalyst.

[Carbon Nanotube Synthesis on Support]

If the carbon source vapor is distributed over the heated support on which the catalyst has been loaded, carbon nanotubes can be synthesized on the support. While carbon nanotube synthesis can also be accomplished with the support particles in a fixed bed state, carrying out the carbon nanotube synthesis with the support particles in a fluidized bed state will permit uniform admixture of the support particles, which is more preferred for homogeneous synthesis of the carbon nanotubes.

[Separation of Carbon Nanotubes from Support]

Separation of the synthesized carbon nanotubes and the loaded catalyst is accomplished by supplying a separating gas. The separating gas may be a gas pulse that is supplied by a method of repeating supply and cutoff of an inert gas to the synthesis at a constant rate for a fixed period of time, i.e. by pulse variation, or a separating gas supplied at a continuous constant flow rate. An active gas may also be used as the separating gas for the carbon nanotube synthesis. When carbon nanotube synthesis is carried out not in a fixed bed state but in a fluidized bed state, friction caused by collision between the particles causes release of the carbon nanotubes, thus allowing more suitable separation of the carbon nanotubes in a stationary manner during synthesis.

[Carbon Nanotube Recovery]

The separated carbon nanotubes entrained in the gas stream are recovered. Various methods may be employed for recovery. First, the gas containing the separated carbon nanotubes may be filtered with the filter to collect the carbon nanotubes on the filter. A cyclone may also be utilized for separation of the carbon nanotubes from the other gases.

[Reloading of Catalyst]

Regeneration of the catalyst that becomes inactivated with carbon nanotube synthesis is an important elementary technique for mass synthesis, continuous production and low-cost obtainment of carbon nanotubes. The causes of inactivation include oxidation and carbonization of the metal nanoparticle catalyst, but the inactivated catalyst can be reduced after oxidation of the catalyst to restore it to a highly active metallic state. However, more prolonged use of the catalyst causes aggregation whereby the number of catalyst metal nanoparticles decreases and the particle sizes increase, and it is difficult to restore the aggregated metal nanoparticles to their micronized form.

This embodiment allows repeated use of the support by reloading of the catalyst. The synthesized carbon nanotubes are first separated from the catalyst for this purpose. Next, the oxidizing treatment is carried out to remove the residual carbon nanotubes and the graphite and amorphous carbon by-products. After oxidizing treatment, the carrier starting material vapor is distributed to accumulate carrier to cover the inactivated aggregate catalyst particles. The catalyst starting material vapor is also distributed for reloading of active fine catalyst particles on the carrier.

The carrier starting material vapor and catalyst starting material vapor may be supplied simultaneously for simultaneous reloading of the carrier and catalyst. During this time, the catalyst segregates on the carrier, naturally forming catalyst particles on the carrier. Incidentally, although the carrier and catalyst can be reloaded with the support particles in a fixed bed state, reloading of the carrier and catalyst with the support particles in a fluidized bed state will permit uniform admixture of the support particles, which is preferred for more homogeneous reloading of both the carrier and catalyst. The oxidizing treatment and carrier reloading are carried out as necessary, as shown in FIG. 3.

[Repetition Procedure]

The carbon source vapor is distributed on the support after completion of reloading of the catalyst, to allow resumption of carbon nanotube synthesis. The key to improved productivity for carbon nanotubes is to lengthen the time required for carbon nanotubes synthesis, with respect to the cycle of the procedure for repetition of carbon nanotube synthesis, carbon nanotube separation, support oxidizing treatment and carrier and catalyst reloading. When carbon nanotube synthesis is carried out with the support particles in a fixed bed state, longer growth of the carbon nanotubes prevents the carbon source vapor from reaching the catalyst on the support, thus lowering the carbon nanotube synthesis rate.

Separation of the carbon nanotubes from the support must therefore be carried out promptly. On the other hand, synthesis of carbon nanotubes with the support particle in a fluidized bed state causes the carbon nanotubes to separate from the support particles by friction produced by collision between the support particles. The carbon source vapor can therefore be satisfactorily supplied to the catalyst particles on the support particles, which is preferred to allow continuous synthesis of carbon nanotubes until the catalyst is inactivated. The oxidizing treatment and carrier and catalyst reloading may be carried out for a period of between 1 second and 10 minutes, although this will depend on the procedure and synthesis conditions.

The carbon nanotube synthesis continues for between 10 seconds and 10 hours. The cycle of the repetition procedure is therefore between 10 seconds and 10 hours, allowing carbon nanotube synthesis for between 10% and 99.99% of the cycle time. The ratio between the repetition procedure cycle time and the carbon nanotube synthesis time is not limited to this range, however.

Figure 4:
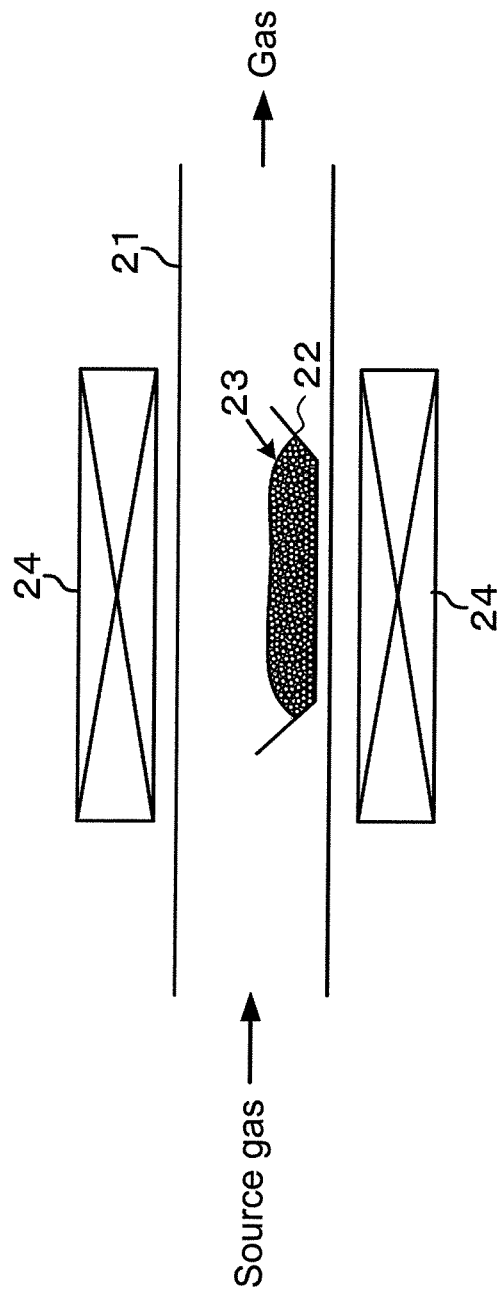
FIG. 4 is a schematic diagram showing another example of an apparatus for producing carbon nanotubes according to an embodiment of the invention.

FIG. 4 is a schematic diagram showing another example of an apparatus for producing carbon nanotubes according to the invention, for production of carbon nanotubes. FIG. 4 is an overview of an apparatus for producing carbon nanotubes according to the invention, using fixed bed CVD. The reactor 21 consists of a horizontal-type cylinder, similar to the one described above. The support particles 23 are layered on a board 22 and placed in the reactor 21. The rest of the operation is similar to the apparatus for producing carbon nanotubes of the invention as described above, and will not be explained again here. FIG. 2(b) shows the catalyst 15 where the support is an anchored substrate 3.

EXAMPLES

Embodiments of the invention will now be explained in greater detail by examples.

Example 1

Example 1 of the invention will now be explained. Here, alumina beads were used as the support, and an $Al_2O_3$ carrier was loaded thereon. The $Al_2O_3$ carrier was formed as a sputter film on the alumina beads. The alumina beads had diameters of 0.5 mm. The thickness of the $Al_2O_3$ carrier (carrier layer) was 20 nm. Fe was loaded as the catalyst on the $Al_2O_3$ carrier. The loading was accomplished by sputter loading. The Fe loaded on the $Al_2O_3$ carrier had a thickness of 1 nm. The support was placed in a reactor and carbon nanotubes were synthesized in a fluidized bed state while supplying gas at ordinary pressure in a 60 Torr $C_2H_4$/200 Torr $H_2$/100 ppmv $H_2O$/Ar balance to the reactor.

Figure 5:
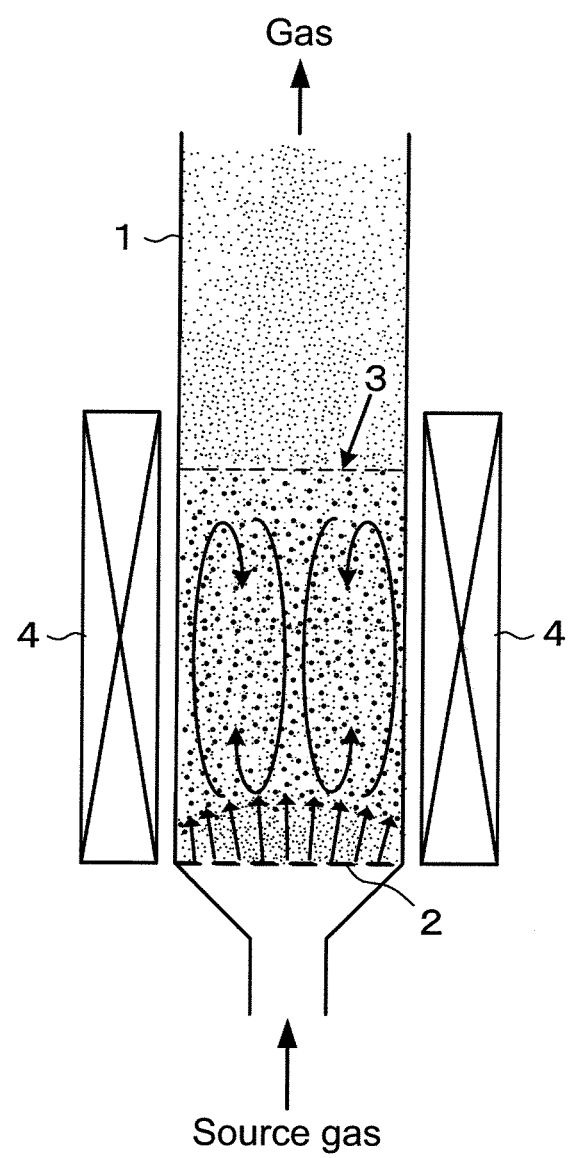
FIG. 5 is a conceptual drawing of the vertical-type CVD apparatus used in Example 1 of the invention.

The reactor was the quartz glass one shown in FIG. 5, and it was a vertical-type CVD reactor that can be used as a fixed bed or as a fluidized bed. The temperature of the reaction zone in the reactor was 800° C. Gas at ordinary pressure was supplied for 10 minutes for synthesis. Since a sputtering method was used for loading of the catalyst, the catalyst was only loaded on half-surfaces of the alumina beads. The carbon nanotubes were therefore grown only on half-surfaces of the alumina beads. As a result of carbon nanotube synthesis in a fluidized bed in this embodiment, the synthesized carbon nanotubes could be synthesized to a height of 0.5 mm. Distribution of the carbon source gas during carbon nanotube synthesis allowed the carbon nanotubes to be separated from the alumina beads.

Figure 6:
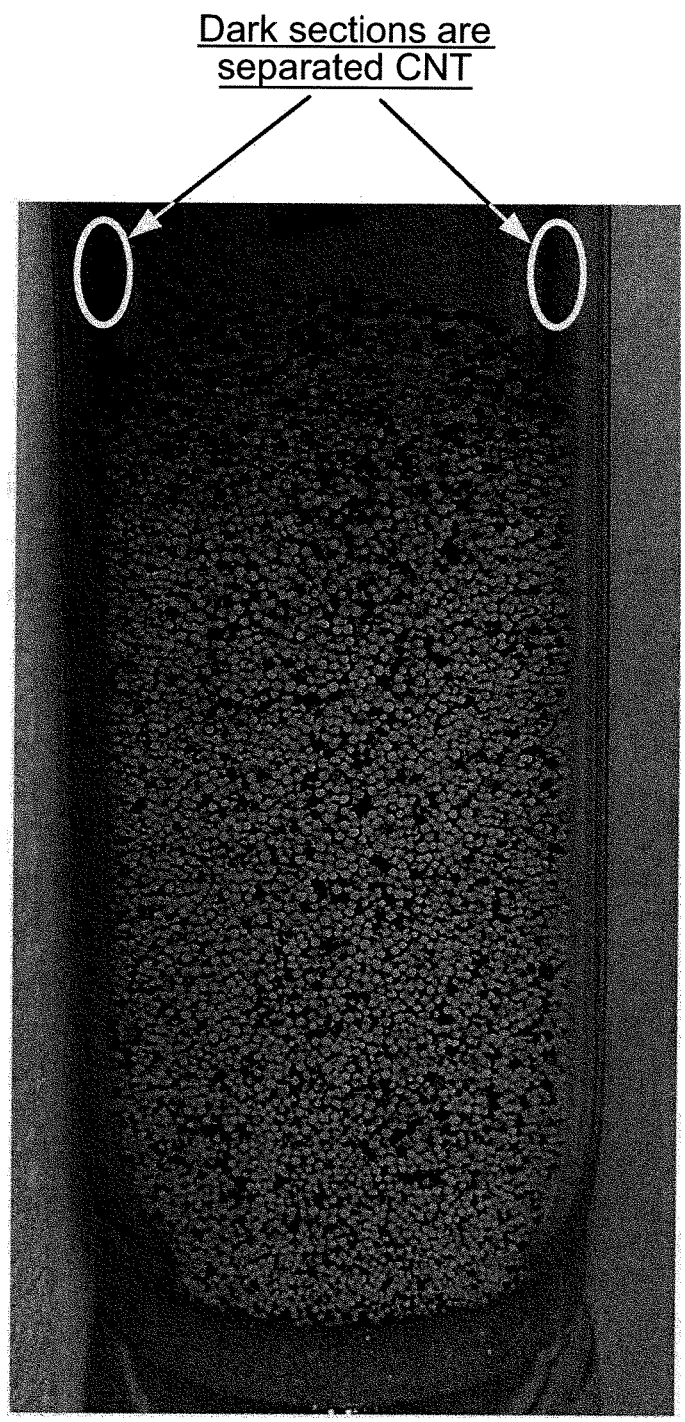
FIG. 6 is a photograph taken after synthesis of carbon nanotubes in Example 1 of the invention.

The photograph in FIG. 6 shows the quartz glass fluidized bed after carbon nanotube synthesis. The photograph was taken with a digital camera. The sections of the alumina beads without growth of carbon nanotubes appear white in the photograph. The sections of the alumina beads with growth of carbon nanotubes appear black in the photograph. The photograph was taken immediately after setting the carbon source gas to a low distribution rate during carbon nanotube synthesis, and synthesizing carbon nanotubes on the support particles in a fluidized bed state. In this photograph, the carbon nanotubes that have grown appear black on the white alumina beads.

Some of the carbon nanotubes were released from the alumina beads, adhering onto the quartz glass reaction tube and causing the colorless transparent quartz glass tube to be colored black. The carbon nanotubes adhering to the quartz glass are indicated by arrows in the photograph.

Figure 7:
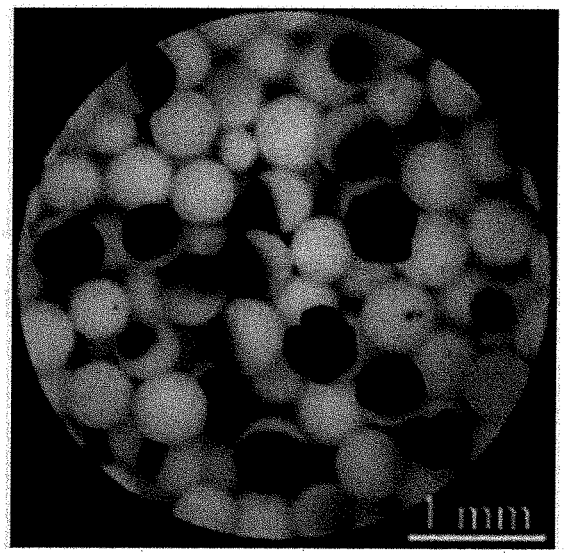
Figure 7:
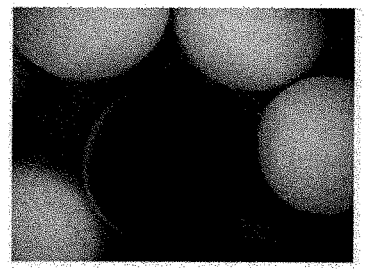
Figure 7:
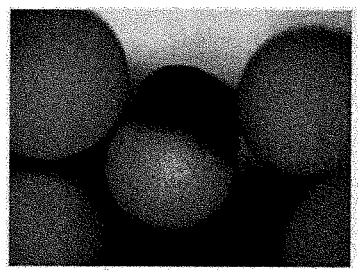

The photograph of FIG. 7 was taken of the alumina beads after carbon nanotube synthesis, using an optical microscope. FIG. 7(a) is a photograph of numerous alumina beads. FIG. 7(b) is a photograph of a synthesized carbon nanotube grown in a perpendicular orientation from half-surface of an alumina bead, taken from the direction of the tip of the carbon nanotube. FIG. 7(c) is a photograph of a carbon nanotube grown in a perpendicular orientation from half-surface of an alumina bead, taken from the side of the carbon nanotube. In this photograph, the carbon nanotubes can be seen to have grown about 0.5 mm on the alumina beads.

Figure 8:
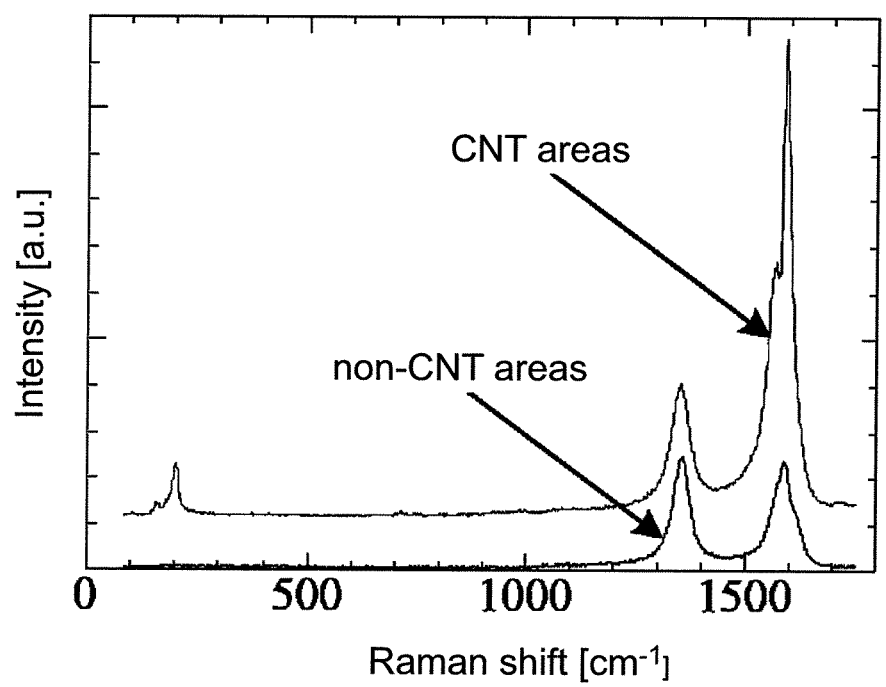
FIG. 8 is a graph showing the results of measuring alumina beads after synthesis of carbon nanotubes in Example 1 of the invention, using a microscopic Raman scattering spectrometer.

FIG. 8 shows the results of measuring alumina beads after synthesis of carbon nanotubes, using a microscopic Raman scattering spectrometer. The microscopic Raman scattering spectrometer used was an STR-250 apparatus by Seki Technotron Corp. (Koto-ku, Tokyo, Japan). The abscissa on the graph represents the Raman shift. The ordinate represents the reception intensity of received light.

The top curve in the graph represents the results of measuring the portions of the alumina beads with carbon nanotubes. The bottom curve in the graph represents the spectrum of the alumina beads. In other words, the bottom curve in the graph represents the results of measuring the portions of the alumina beads without carbon nanotube synthesis. From this graph, judging by the top curve representing the portions with carbon nanotubes, the G-band near 1590 $cm^{-1}$ is large while the D-band near 1350 $cm^{-1}$ is small. This indicates that relatively high-quality carbon nanotubes had been obtained. Also, the RBM peak near 200 $cm^{-1}$ indicates that SWCNT had been obtained.

Also in the graph, judging from the bottom curve representing the results of measuring the portions of the alumina beads without carbon nanotubes, the D-band near 1350 $cm^{-1}$ is the same while the intensities of the G-band near 1590 $cm^{-1}$ and the RBM peak near 200 $cm^{-1}$ are smaller. This indicates that almost no carbon nanotubes had been grown on the beads without the loaded catalyst, despite some carbon deposition.

Figure 9:
Figure 9:
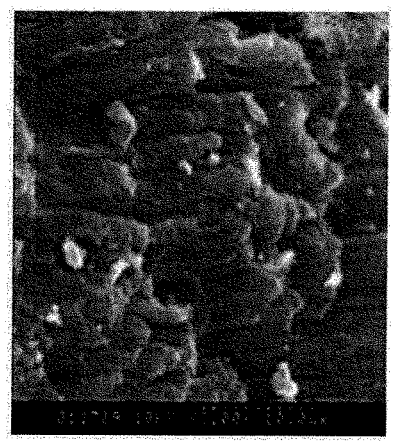
Figure 9:
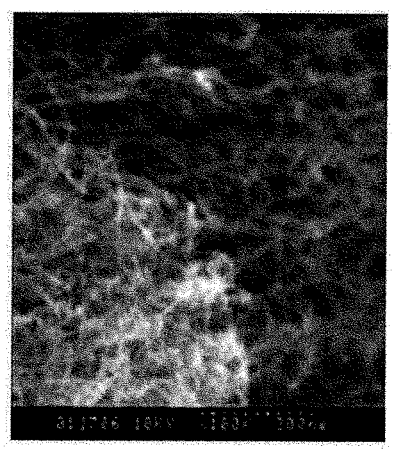

FIG. 9 is a photograph showing the results of measuring the alumina beads with a scanning electron microscope. The scanning electron microscope used was a Model S-900 by Hitachi High-Technologies Corp. (Minato-ku, Tokyo, Japan). The photograph was taken from the side of a group of carbon nanotubes. FIG. 9(a) is a photograph showing the state of oriented growth with the carbon nanotubes aligned. FIG. 9(b) is a magnified photograph of the tip sections of the group of carbon nanotubes. FIG. 9(c) is a further magnified photograph of the tip sections of the group of carbon nanotubes. The photograph in FIG. 9(c) shows growth of fine carbon nanotubes with diameters of no greater than 10 nm. The photographs show that the carbon nanotubes had grown in groups on half-surfaces of the alumina beads. It is also seen that the carbon nanotubes included SWCNT and had grown to diameters of no greater than 10 nm and lengths of several 100 µm.

Example 2

Example 2 of the invention will now be explained. For Example 2, the catalyst was loaded by distributing carrier starting material vapor and catalyst starting material vapor over the alumina beads in a high-temperature state. Next, the carbon source vapor was distributed over the alumina beads in a high-temperature state on which the catalyst had been loaded, for synthesis of carbon nanotubes. Alumina beads were used as the support. The alumina beads used had diameters of 0.5 mm. For Example 2, the alumina beads were set in a horizontal-type CVD apparatus shown in FIG. 4 and treated in the following manner.

First, 0.2-0.5 mL tetraethoxyorthosilicate (TEOS) was supplied at ordinary pressure, with the entire apparatus in a state heated to around 700° C. The TEOS supplied to the reactor evaporated and reacted on the surfaces of the alumina beads, forming a $SiO_2$ carrier layer. Next, the entire apparatus was brought to about 400° C. and an $Al_2O_3$ carrier and Fe catalyst were simultaneously loaded onto the $SiO_2$-covered alumina beads. Specifically, vapor of 3 mg of aluminum isopropoxide as the carrier source and vapor of 10 mg of iron-acetylacetone as the catalyst source were simultaneously supplied to the reactor, and the Fe catalyst/$Al_2O_3$ carrier was loaded at 3-5 Torr. Next, the entire apparatus was brought to 820° C., and a gas stream at ordinary pressure in a 60 Torr $C_2H_4$/200 Trr $H_2$/50 ppmv $H_2O$/Ar balance was distributed for 7 minutes for carbon nanotube synthesis.

Figure 10:
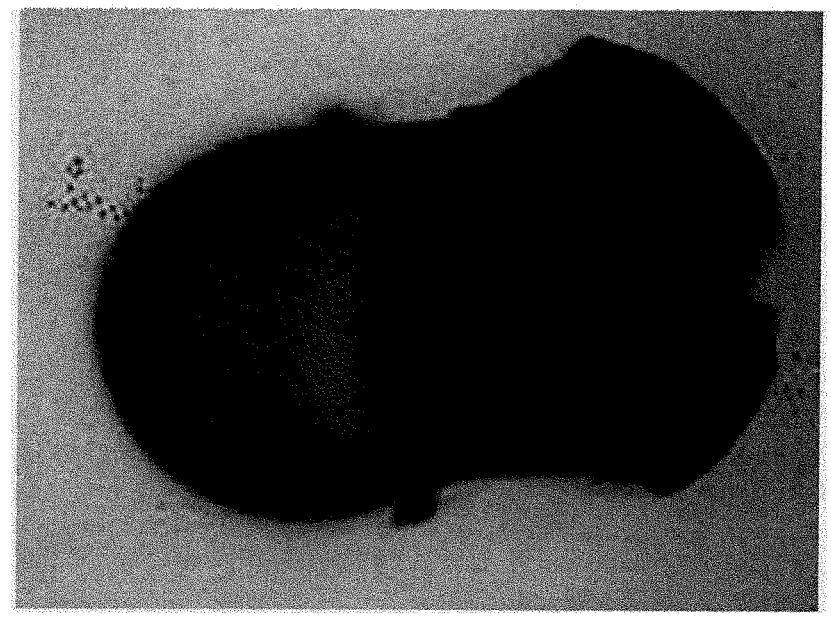
FIG. 10(a) and FIG. 10(b) are optical microscope photographs showing carbon nanotubes growing in Example 2 of the invention.
Figure 10:
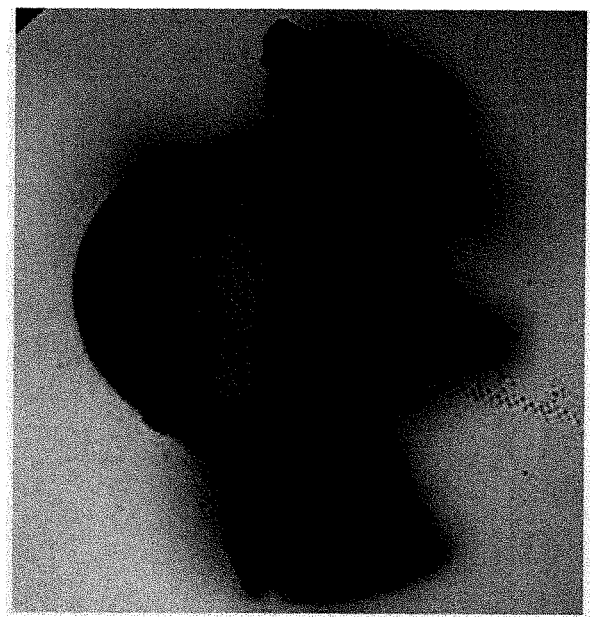

For Example 2, the treatment described above was carried out with the alumina beads not fluidized but filling the boat in a stationary phase CVD reactor, and therefore the carbon nanotubes grew on half-surfaces of the alumina beads. Example 2 demonstrated that switching the supplied gas streams allows all of the procedures for carrier layer formation, catalyst loading and carbon nanotube growth to be accomplished on high-temperature alumina beads. The photographs in FIG. 10(a) and (b) were taken of the state of the growing carbon nanotubes. The photographs were taken with an optical microscope.

Example 3

Example 3 of the invention will now be explained. Carbon nanotube synthesis was carried out repeatedly in Example 3. Alumina beads with 0.5 mm diameters were used as the support. For Example 3, the alumina beads were set in a horizontal-type CVD apparatus shown in FIG. 4 and treated in the following manner. First, a $SiO_2$ carrier layer was formed on the surfaces of the alumina beads. Specifically, 0.2-0.5 mL TEOS was supplied at ordinary pressure onto the alumina beads with the entire reactor heated to around 700° C. The TEOS supplied to the reactor evaporated and reacted on the surfaces of the alumina beads, forming a $SiO_2$ carrier layer.

Next, an $Al_2O_3$ carrier and Fe catalyst were simultaneously loaded onto the $SiO_2$-covered alumina beads. The simultaneous loading was carried out with the entire reactor heated to around 400° C. Vapor of 3 mg of aluminum isopropoxide as the carrier source and vapor of 10 mg of iron-acetylacetone as the catalyst source were simultaneously supplied to the reactor, and the Fe catalyst/$Al_2O_3$ carrier was loaded at 3-5 Torn Next, the entire reactor was heated to 820° C., and a gas stream at ordinary pressure in a 60 Torr $C_2H_4$/200 Torr $H_2$/50 ppmv $H_2O$/Ar balance was distributed for 7 minutes for carbon nanotube synthesis.

The alumina beads were then heated at 800° C. in an air atmosphere for oxidizing treatment of the carbon nanotubes, and the carbon nanotubes attached to the alumina beads were removed. A $SiO_2$ carrier layer was formed thereover and then an Fe catalyst/$Al_2O_3$ carrier was loaded, under the same conditions as above, for re-growth of carbon nanotubes. Carbon nanotube synthesis was thus carried out repeatedly.

For Example 3, the treatments described above were carried out with the alumina beads not fluidized but filling the boat in the reactor. The carbon nanotubes therefore grew on half-surfaces of the alumina beads. This demonstrated that switching the supplied gas streams allows all of the procedures for carrier layer formation, catalyst loading and carbon nanotube growth to be accomplished on high-temperature alumina beads. After synthesis of the carbon nanotubes, the carbon remaining on the alumina beads was removed effectively by changing the gas atmosphere into the oxidizing treatment condition. The carrier and catalyst were then loaded for re-growth of carbon nanotubes. It was thus demonstrated that reloading of the catalyst allows repeated synthesis of carbon nanotubes on the support.

Figure 11:
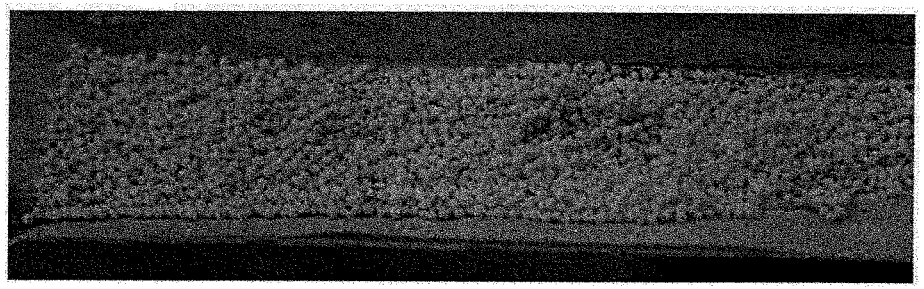
Figure 11:
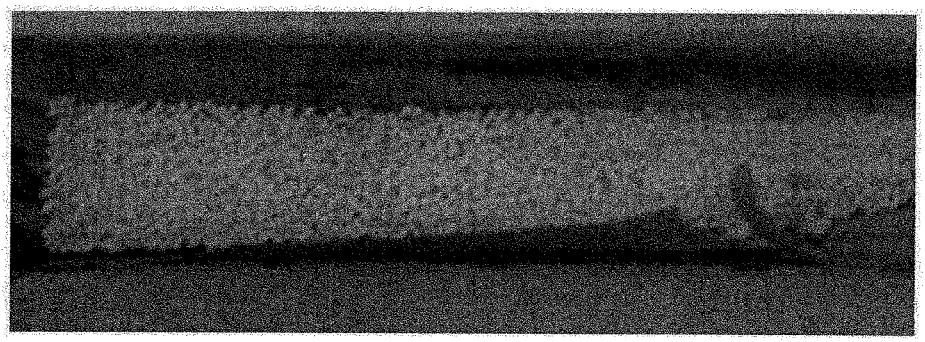
Figure 11:
Figure 12:
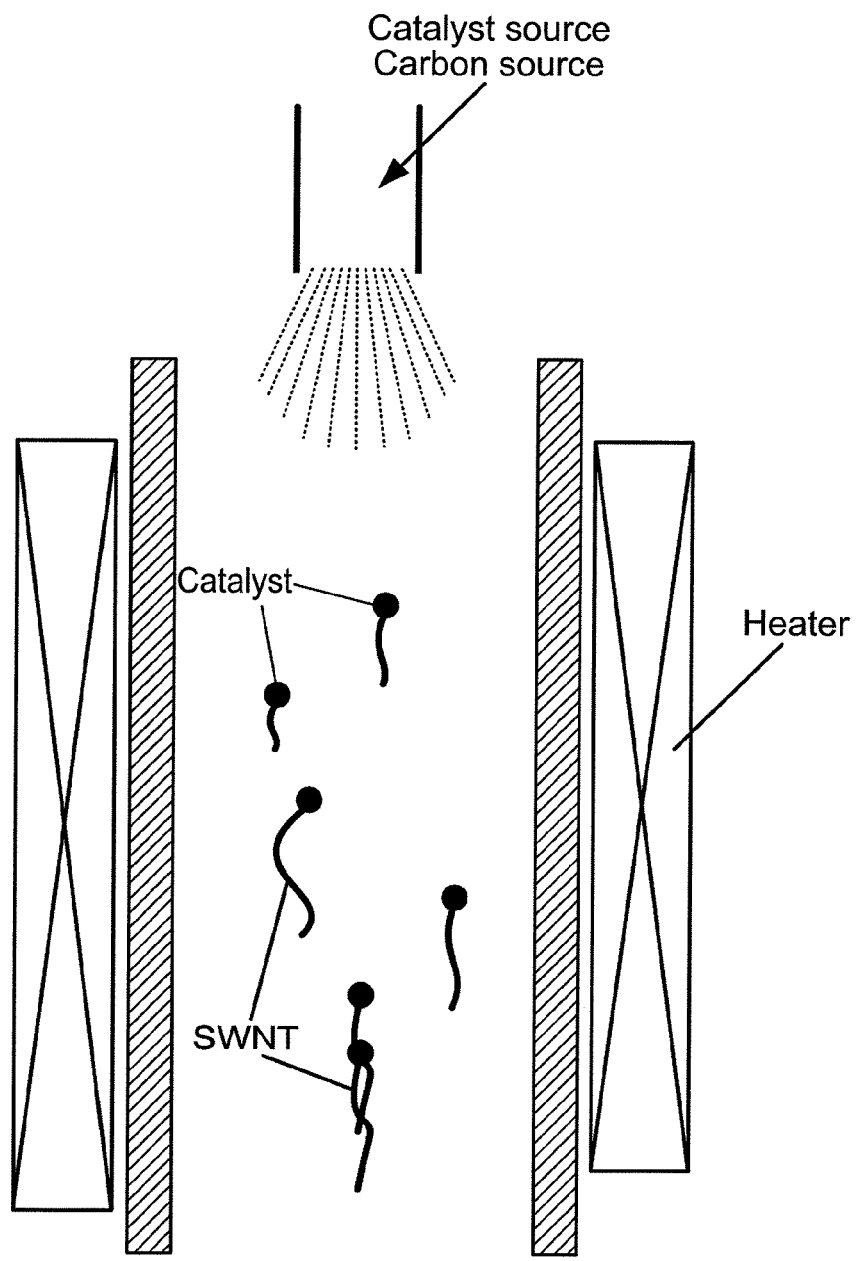
FIG. 12 is a diagram showing an overview of production of carbon nanotubes using a nanoparticle catalyst in a gas phase dispersion state (method A) (prior art).
Figure 13:
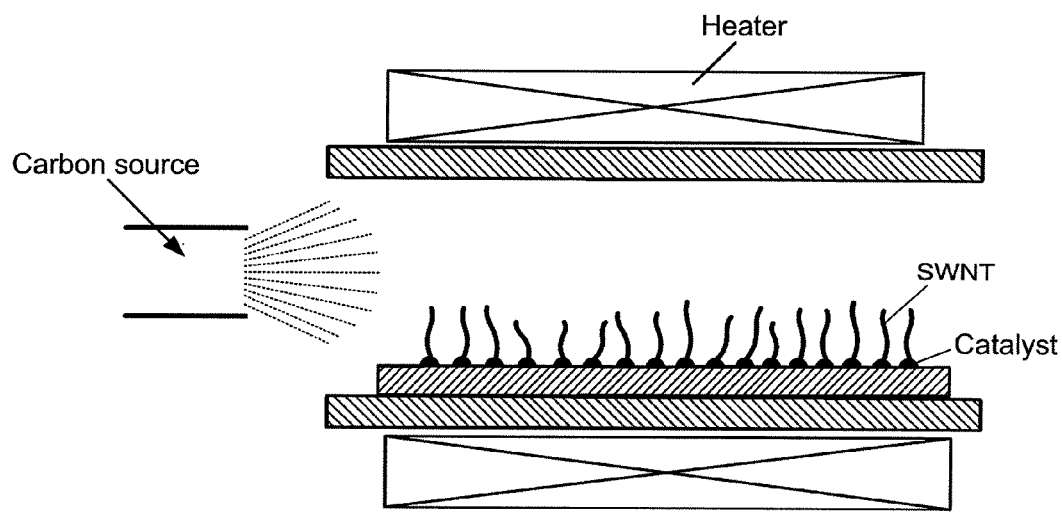
FIG. 13 is a diagram showing an overview of production of carbon nanotubes using a nanoparticle catalyst in a substrate-supported state (method B) (prior art).

The photographs in FIG. 11 show alumina support particles with repeated carbon nanotube synthesis using a quartz glass fixed bed CVD apparatus. The photographs were taken with a digital camera. The photographs were taken with the alumina beads in the boat used for setting in the reactor. FIG. 11(a) is a photograph taken after oxidative removal of the carbon nanotubes attached to the alumina beads, upon completion of the first cycle. This photograph shows that the alumina beads returned to a white color by oxidizing treatment, and that the carbon deposits including the carbon nanotubes had been removed.

FIG. 11(b) is a photograph taken during the second cycle, conducted after completion of the first cycle. Specifically, it is a photograph of the alumina beads after forming an $SiO_2$ carrier layer on the alumina beads and simultaneously loading the $Al_2O_3$ carrier and Fe catalyst. The alumina beads appear white. This photograph shows that the alumina beads were colored white due to $Al_2O_3$ and $SiO_2$, while the Fe catalyst was not colored since it had a low nanometer level thickness. FIG. 11(c) is a photograph of the state of carbon nanotubes grown on alumina beads after synthesis of the carbon nanotubes in the second cycle. The carbon nanotubes had grown to about 0.5 mm. This photograph shows that portions of the carbon nanotubes grown on the alumina beads had changed color to black.

Example 4

Example 4 of the invention will now be explained. For Example 4, the series of steps comprising loading of the catalyst carrier and catalyst on the support, carbon nanotube synthesis on the support, separation and recovery of the carbon nanotubes, and removal of the carbon remaining on the support, were carried out by switching only the gas supply at a constant temperature in a fluidized bed state, and this was repeated for 4 cycles.

First, alumina beads with diameters of 0.5 mm were used as the support, and 40 g were placed in the quartz glass reactor shown in FIG. 5. Ar gas was distributed at 4 L/min and the temperature was raised to 820° C. in a fluidized state, for the first cycle process. Ar gas was distributed at 50 cc/min onto aluminum isopropoxide heated to 30° C. to generate an aluminum isopropoxide/Ar mixed gas, and then merged with an Ar carrier gas at 10 L/min and distributed into the fluidized bed reactor for 3 minutes, for loading of the $Al_2O_3$ carrier onto the alumina beads. After then distributing Ar at 50 cc/min onto ferrocene heated to 120° C. to generate a ferrocene/Ar mixed gas, it was merged with a 4 vol% $O_2$/0.002 vol% $H_2O$/Ar mixed gas at 10 L/min and distributed into the fluidized bed reactor for 1 minute for loading of Fe catalyst. Next, a mixed gas with an 8 Torr $C_2H_2$/200 Torr $H_2$/600 ppmv $H_2O$/Ar balance was distributed for 10 minutes at 3 L/min for synthesis of carbon nanotubes. Ar gas was then distributed at 10-15 L/min for 5-10 minutes to separate the carbon nanotubes from the alumina beads, and the separated carbon nanotubes were recovered with a collector comprising a quartz glass tube and a filter. Next, 12 vol % $O_2$/0.005 vol % $H_2O$/Ar gas was distributed at 5 L/min for 10 minutes to remove the carbon remaining on the alumina beads, to complete the first cycle. The second cycle process was then immediately started with the reactor temperature kept at 820° C., and was followed by the third cycle, and fourth cycle process.

Figure 14:
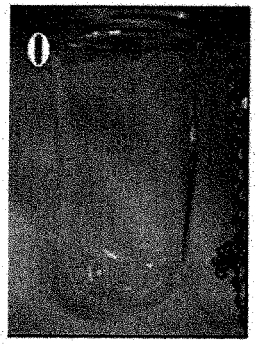
Figure 14:
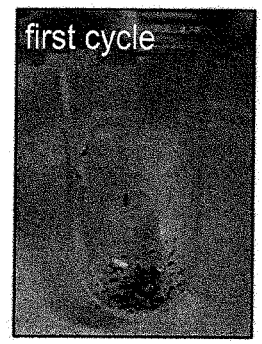
Figure 14:
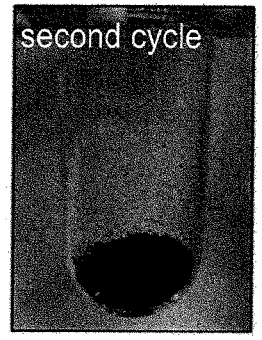
Figure 14:
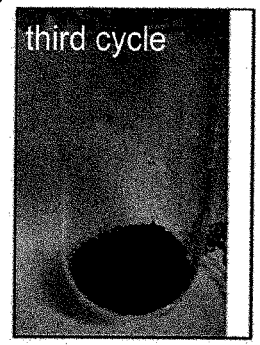
Figure 14:
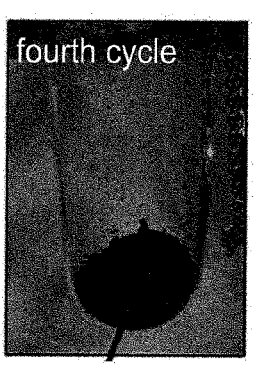
Figure 14:
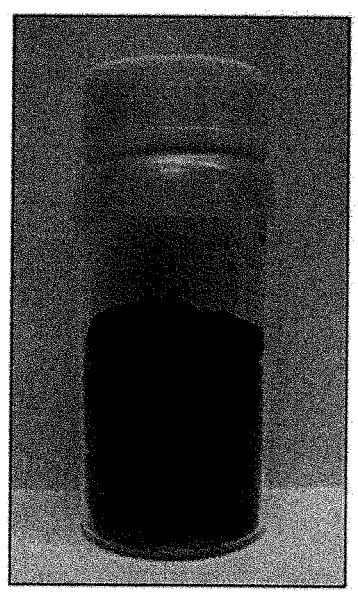

The photographs of FIG. 14(a) to (e) are photographs of carbon nanotubes recovered in the collector. FIG. 14(a) shows the collector before recovery of the carbon nanotubes, FIG. 14(b) shows the yield of carbon nanotubes recovered in the first cycle, FIG. 14(c) shows the yield of carbon nanotubes recovered in the second cycle, FIG. 14(d) shows the yield of carbon nanotubes recovered in the third cycle and FIG. 14(e) shows the yield of carbon nanotubes recovered in the fourth cycle. FIG. 14(f) shows the total amount of carbon nanotubes recovered in the first to fourth cycles. These photographs indicate that, despite the low yield in the first cycle, the amount of carbon nanotube recovery increased each time in the second, third and fourth cycles. The low yield in the first cycle was presumably due to adhesion of the carbon nanotubes onto the reaction tube walls, and the effect of the catalyst activity on the alumina beads. That is, from the second cycle onward, presumably a balance was established between loss of the carbon nanotubes due to their adhesion onto the reaction tube inner walls, and obtainment of carbon nanotubes by release of the carbon nanotubes adhering to the inner walls in the previous cycle, while the $Al_2O_3$ carrier layer was formed to a sufficient thickness on the alumina beads leading to increased catalyst activity, and this resulted in increased yield. Upon completion of the fourth cycle, the total carbon nanotube yield was 140 mg. Continuous synthesis of CNT was therefore possible with high productivity, compared to a fluidized bed with a volume of 15 cm³ (inner diameter: 2.5 cm, layer height: 3 cm).

Figure 15:
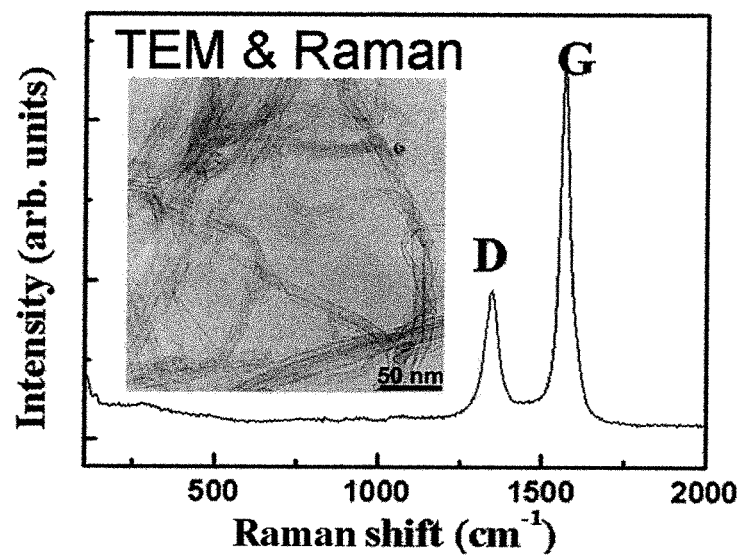
FIG. 15 is a graph showing the Raman spectrum for the carbon nanotubes synthesized in Example 4, with a transmission electron microscope image.

FIG. 15 is a graph showing the Raman spectrum for the carbon nanotubes synthesized in Example 4, with a transmission electron microscope image. From the Raman spectrum it is seen that a spectrum with a G/D of ≥2 was obtained, and that relatively high-quality carbon nanotubes had been synthesized. Also, the transmission electron microscope image shows that the obtained carbon nanotubes included single-wall carbon nanotubes with diameters of 5-10 nm and 1-5 walls.

INDUSTRIAL APPLICABILITY

The method for producing carbon nanotubes according to the invention allows mass production and can significantly reduce production cost. The uses of carbon nanotubes produced according to the invention therefore include applications such as transparent electrodes, semiconductor thin-films, lithium ion cell electrode materials, fuel cell electrode materials, electrical double layer capacitor electrode materials, composite polymer filler materials, electron emission guns, field emission displays, microscope probes, gas occlusion materials and the like. Particular applications of the single-wall carbon nanotubes produced according to the invention include transparent electrodes, lithium ion cell electrode materials, electrical double layer capacitor electrode materials and the like.

The invention claimed is:

1. A method for producing carbon nanotubes wherein a carbon source that contains carbon and is decomposed when heated and a catalyst that serves as a catalyst for production of carbon nanotubes from the carbon source, are used to synthesize the carbon nanotubes on a heated support placed in a reactor, the method comprising:
   a catalyst loading step in which the catalyst starting material, as the starting material for the catalyst, is distributed over the support to load the catalyst onto the support, wherein the catalyst comprises a carrier layer and catalyst particles, the catalyst particles being loaded on the support via the carrier layer,
   a synthesis step in which the carbon source is distributed over the support to synthesize the carbon nanotubes on the support, and
   a separating step in which a separating gas stream is distributed over the support to separate the carbon nanotubes from the support,
   wherein the catalyst loading step, the synthesis step and the separating step are carried out while keeping the support in a heated state in said reactor, and by switching supply of the catalyst starting material, the carbon source and the separating gas stream to said reactor, and
   wherein the support is made of alumina, and the carrier layer is made of an $Al_2O_3$—$SiO_2$ complex oxide.

2. The method for producing carbon nanotubes according to claim 1, wherein, in the separating step, the carbon nanotubes are separated from the catalyst, the catalyst being maintained on the support.

3. A method for producing carbon nanotubes wherein a carbon source that contains carbon and is decomposed when heated and a catalyst that serves as a catalyst for production of carbon nanotubes from the carbon source, are used to synthesize the carbon nanotubes on a heated support placed in a reactor, the method comprising:
   a catalyst loading step in which the catalyst starting material, as the starting material for the catalyst, is distributed over the support to load the catalyst onto the support,
   a synthesis step in which the carbon source is distributed over the support to synthesize the carbon nanotubes on the support, and
   a separating step in which a separating gas stream is distributed over the support having the catalyst loaded thereon, to separate the carbon nanotubes from the catalyst loaded on the support, wherein in the separating step, the catalyst is maintained loaded on the support while the carbon nanotubes are separated from the catalyst loaded on the support,
   wherein the catalyst loading step, the synthesis step and the separating step are carried out while keeping the support in a heated state in said reactor, and by switching supply of the catalyst starting material, the carbon source and the separating gas stream to said reactor.

4. The method for producing carbon nanotubes according to claim 1, wherein the support is made of alumina beads.

5. The method for producing carbon nanotubes according to claim 1, wherein the catalyst particles are made of Fe or Co.

6. A method for producing carbon nanotubes wherein a carbon source that contains carbon and is decomposed when heated and a catalyst that serves as a catalyst for production of carbon nanotubes from the carbon source, are used to synthesize the carbon nanotubes on a heated support placed in a reactor, the method comprising:
   a catalyst loading step in which the catalyst starting material, as the starting material for the catalyst, is distributed over the support to load the catalyst onto the support,
   a synthesis step in which the carbon source is distributed over the support to synthesize the carbon nanotubes on the support, and
   a separating step in which a separating gas stream is distributed over the support having the catalyst loaded thereon, to separate the carbon nanotubes from the catalyst loaded on the support, wherein in the separating step, the catalyst is maintained loaded on the support while the carbon nanotubes are separated from the catalyst loaded on the support,
   wherein the catalyst loading step, the synthesis step and the separating step are carried out while keeping the support in a heated state in said reactor, and by switching supply of the catalyst starting material, the carbon source and the separating gas stream to said reactor, and wherein the separating gas stream is a gas pulse supplied by repeating supply and cutoff of gas to the support having the catalyst loaded thereon.

* * * * *